(12) United States Patent
Murasawa et al.

(10) Patent No.: US 8,125,939 B2
(45) Date of Patent: Feb. 28, 2012

(54) BASE STATION APPARATUS, COMMUNICATION METHOD AND MOBILE COMMUNICATION SYSTEM FOR RESTRAINING TRAFFIC QUANTITY

(75) Inventors: Shunichi Murasawa, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 12/191,397

(22) Filed: Aug. 14, 2008

(65) Prior Publication Data

US 2009/0109933 A1    Apr. 30, 2009

(30) Foreign Application Priority Data

Oct. 29, 2007  (JP) ................ 2007-280844

(51) Int. Cl.
*H04B 7/14* (2006.01)

(52) U.S. Cl. ........ 370/315; 370/274; 370/279; 370/293; 370/310.2; 370/349; 370/395.31; 370/492; 455/7; 455/11.1; 455/13.1; 455/422.1; 709/231; 709/236; 709/240; 709/242

(58) Field of Classification Search .......... 370/274, 370/279, 293, 310.2, 315, 316, 328–339, 370/349, 395.31, 395.32, 492, 501; 455/7, 455/11.1, 13.1, 422.1, 455; 709/231, 236, 709/238–244
See application file for complete search history.

(56) References Cited

U.S. PATENT DOCUMENTS

| | | | | |
|---|---|---|---|---|
| 5,940,771 A | * | 8/1999 | Gollnick et al. | 455/517 |
| 2004/0088641 A1 | * | 5/2004 | Torsner et al. | 714/776 |
| 2004/0233896 A1 | | 11/2004 | Lin et al. | |
| 2005/0174998 A1 | * | 8/2005 | Vesterinen et al. | 370/354 |
| 2006/0251008 A1 | * | 11/2006 | Wu et al. | 370/328 |
| 2007/0053295 A1 | * | 3/2007 | Cleveland et al. | 370/235 |
| 2007/0105549 A1 | | 5/2007 | Suda et al. | |
| 2007/0191031 A1 | * | 8/2007 | Mohanty et al. | 455/458 |
| 2008/0112357 A1 | * | 5/2008 | Gossain et al. | 370/329 |
| 2008/0212512 A1 | * | 9/2008 | Harpek et al. | 370/315 |
| 2008/0260389 A1 | * | 10/2008 | Zheng | 398/115 |

OTHER PUBLICATIONS

Okuda et al., MS Network Entry for Transparent Relay Station, Jan. 16, 2007, IEEE.*
Stewart, RFC 4960—Stream Control Transmission Protocol, Sep. 2007, IETF.*
European Search Report issued on Feb. 26, 2009 in the corresponding EP Application No. 08161929.8.
3GPP TS 36.300 v8.1.0 section10.1.2 url <http://www.3gpp.org/ftp/Specs/html-info/36300.htm>, Jul. 28, 2008.

* cited by examiner

*Primary Examiner* — Aung S Moe
*Assistant Examiner* — Hoon J Chung
(74) *Attorney, Agent, or Firm* — Myers Wolin, LLC.

(57) ABSTRACT

To provide a technology capable of reducing a processing load on a base station controller and restraining a traffic quantity within a mobile communication system. A base station apparatus connected to a base station controller has a first establishing unit establishing a first logic communication path between the base station apparatus and the base station controller; a second establishing unit establishing a second logic communication path between the base station apparatus and another base station apparatus; and a forwarding unit forwarding data, transmitted and received with the another base station apparatus and the base station controller serving as terminal points, as data of another base station apparatus via the first logic communication path and the second logic communication path.

12 Claims, 17 Drawing Sheets

FIG. 2
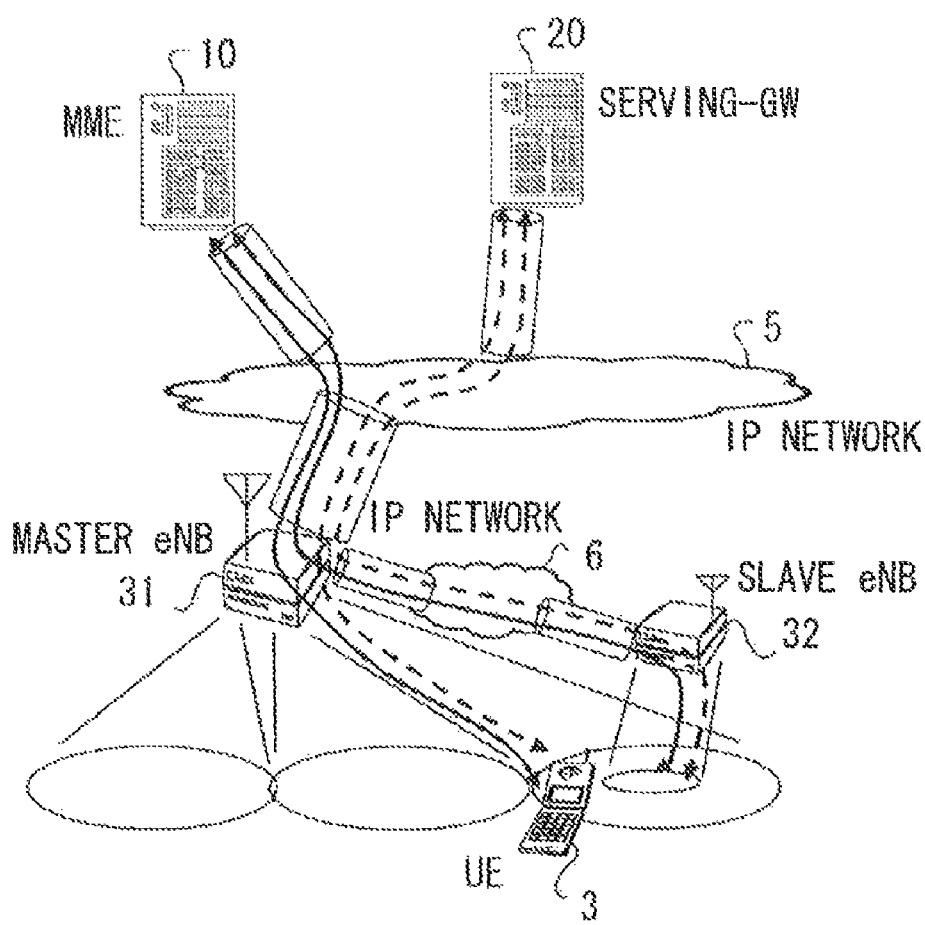
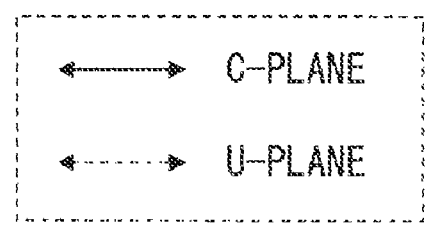

FIG. 3
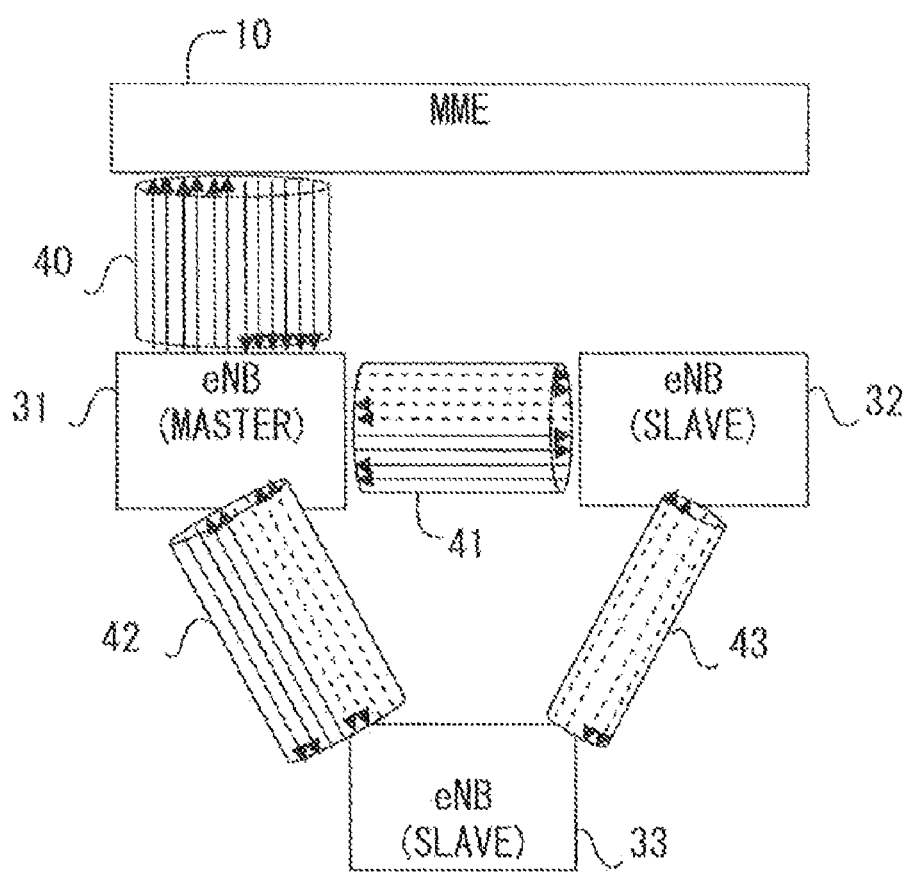
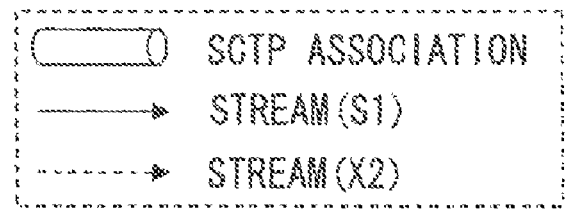

FIG. 4
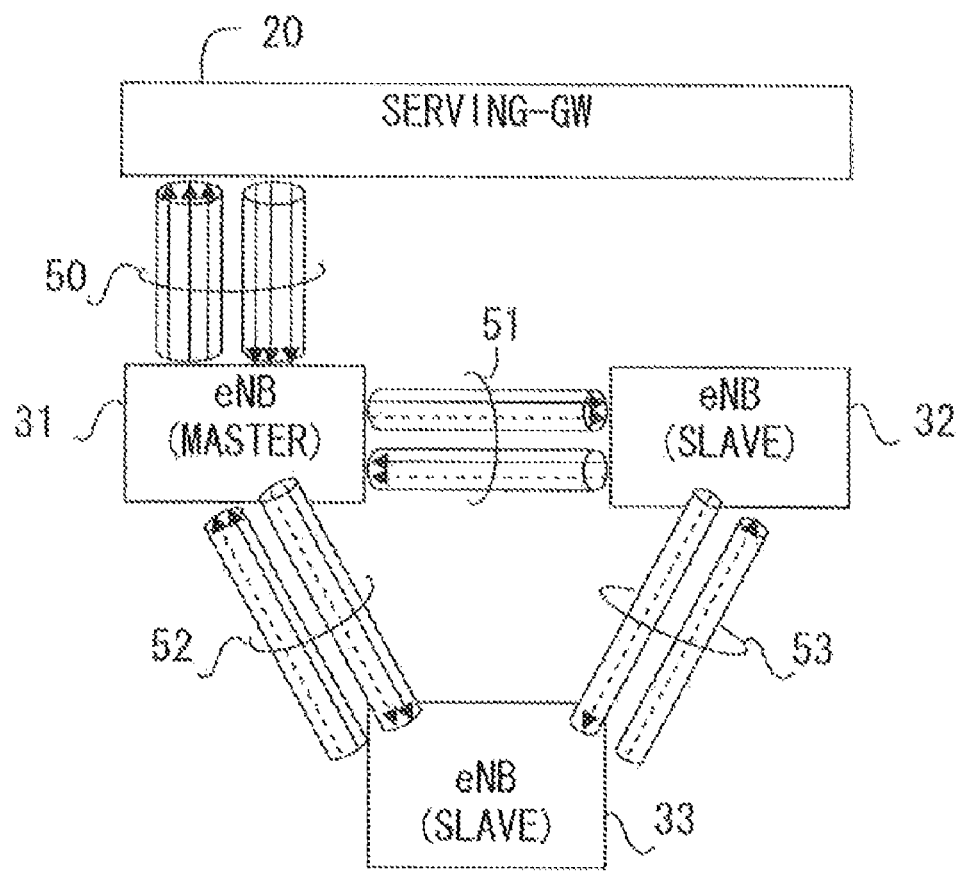
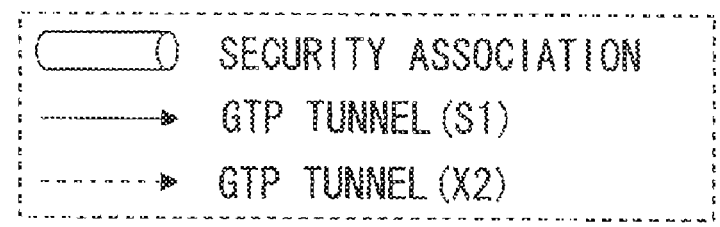

FIG. 8

| RECEPTION DATA CHUNK INFORMATION | FORWARDING DESTINATION DATA CHUNK INFORMATION |
|---|---|
| SCTP ASSOCIATION ID = A<br>STREAM ID = a | SCTP ASSOCIATION ID = B<br>STREAM ID = b (SLAVE BIT=1) |
| SCTP ASSOCIATION ID = B<br>STREAM ID = b (SLAVE BIT=1) | SCTP ASSOCIATION ID = A<br>STREAM ID = a |
| | |
| | |
| | |

FIG. 9

| RECEPTION GTP TUNNEL INFORMATION | FORWARDING DESTINATION GTP TUNNEL INFORMATION |
|---|---|
| GTPID#2<br>(TRANSPORT ADDRESS = MASTER eNB,<br>TE-ID = G2) | GTPID#1<br>(TRANSPORT ADDRESS = SERVING-GW,<br>TE-ID = G1) |
| GTPID#3<br>(TRANSPORT ADDRESS = MASTER eNB,<br>TE-ID = G3) | GTPID#4<br>(TRANSPORT ADDRESS = SLAVE eNB,<br>TE-ID = G4) |

FIG. 16
RELATED ART
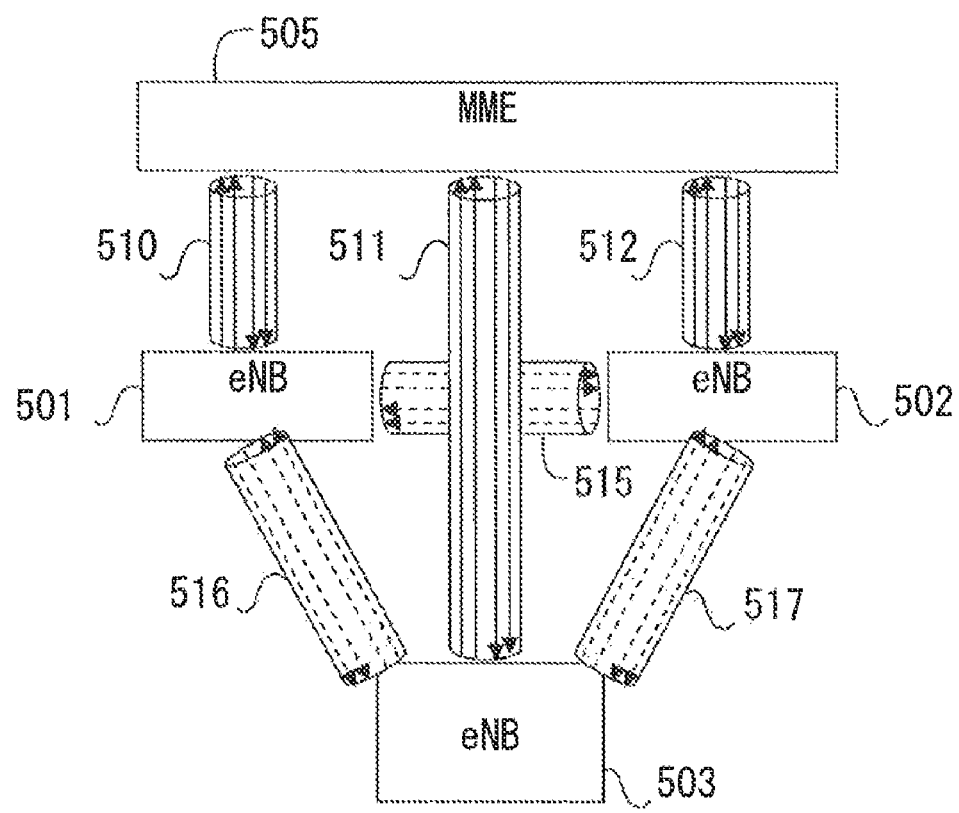
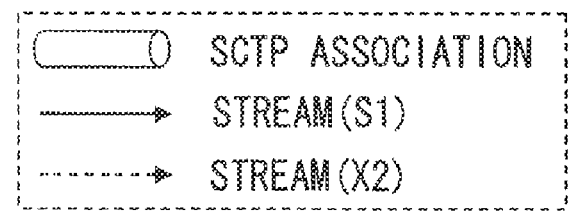

FIG. 17
RELATED ART
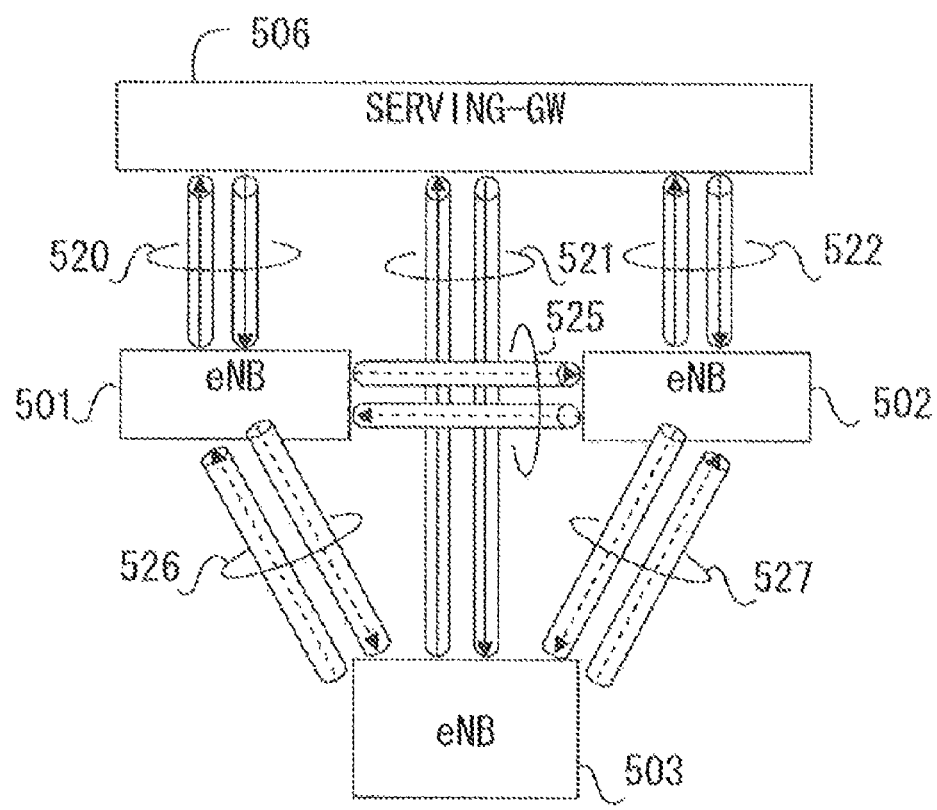
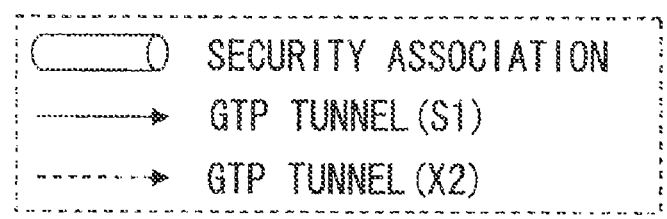

BASE STATION APPARATUS, COMMUNICATION METHOD AND MOBILE COMMUNICATION SYSTEM FOR RESTRAINING TRAFFIC QUANTITY

This application claims the benefit of Japanese Patent Application No. 2007-280844 filed on Oct. 29, 2007 in the Japanese Patent Office, the disclosure of which is herein incorporated in its entirety by reference.

BACKGROUND OF THE INVENTION

1. Field of the invention

The present invention relates to a communication technology in a mobile communication system including a plurality of base station apparatuses and a base station controller.

2. Description of the Related Art

LTE (Long Term Evolution) given a generic name is a high speed data communication system for mobile equipment, of which the standardization is now underway in 3GPP (3rd Generation Partnership Project). The LTE is ranked stepwise for a smooth shift to the next generation (4G) in a way that attains further evolutions of the W-CDMA (Wideband Code Division Multiple Access) system called 3G, HSDPA (High Speed Downlink Packet Access) system called 3.5G, etc.

In the mobile communication system adopting the LTE, a conventional RNC (Radio Network Controller) function is shared among an evolved NodeB (which will hereinafter be abbreviated to eNB) defined as a base station apparatus, an MME (Mobility Management Entity) defined as a base station controller in a core network system and a serving gateway (which will hereinafter be abbreviated to serving GW) (also called SAE GW), whereby the RNC device itself is deleted. This type of LTE mobile communication system gets diversified in terms of a topology among the eNB, the MME and the serving GW.

FIG. 15 is a diagram showing an example of a system architecture of the conventional LTE mobile communication system. As exemplified in FIG. 15, in the LTE mobile communication system, the same mobile communication system accommodates eNB 501 having an oriented communication area for a public network and home eNB 502 having an oriented communication area for an individual user. Namely, a considerable number of eNB 501 and home eNB 502 are connected via a IP network 500 to an MME 505 and a serving GW 506.

By the way, a communication protocol in the LTE mobile communication system is configured by a user plane (which will hereinafter be simply referred to as the U-plane) that handles transmission and reception of user data between users and a control plane (which will hereinafter be simply referred to as the C-plane) that handles control of user calls and connections in order to control the U-plane. In the LTE mobile communication system, a transport layer protocol on the C-plane involves utilizing SCTP (Stream Control Transmission Protocol), and a transport layer protocol on the U-plane involves utilizing GTP (GPRS (General Packet Radio Service) Tunneling Protocol) and UDP (User Datagram Protocol).

The SCTP enables a connection called an SCTP association to be established between end points, and plural streams of user messages to be independently forwarded within the SCTP association. The GTP involves employing a GTP tunnel, thereby transparently forwarding a data packet transmitted and received between mobile terminals (user equipment (UE)) on the mobile communication system network including the IP network 500.

FIGS. 16 and 17 are conceptual diagrams showing a topology on the C-plane and a topology on the U-plane in the conventional LTE mobile communication system. As illustrated in FIGS. 16 and 17, according to the conventional LTE mobile communication system, the eNB 501, eNB 502 and eNB 503 are each linked to the MME 505 and also connected to each other. Herein, in the interfaces employed on the application layer of the individual nodes utilizing the SCTP layer or the GTP layer, the interface connecting each node eNB to the MME is called an S1 interface (depicted by an arrowhead of a solid line in FIGS. 16 and 17), and the interface establishing the connection between the eNB is called an X2 interface (depicted by an arrowhead of a broken line in FIGS. 16 and 17). A message on the application layer, which is sent and received via this S1 interface, is notated by an S1-AP message, and a message on the application layer, which is sent and received via the X2 interface, is notated by an X2-AP message.

Further, FIGS. 16 and 17 show examples, in which two outbound streams (the SCTP streams for transmission) and two inbound streams (the SCTP streams for reception) are set up between the individual nodes on the C-plane, and a single outbound GTP tunnel (the GTP tunnel for transmission) and a single inbound GTP tunnel (the GTP tunnel for reception) are set up between the respective nodes on the U-plane.

In such a case, as illustrated in FIG. 16, in the conventional topology on the C-plane, SCTP associations 510 through 517 are established in which the four SCTP streams are set up between the MME 505 and the eNB 501, eNB 502 and eNB 503, and the four SCTP streams are set up among the eNB 501, eNB 502 and eNB 503. The four SCTP streams for the S1 interface are set up in the SCTP associations 510, 511 and 512, and the four SCTP streams for the X2 interface are set up in the SCTP associations 515, 516 and 517.

The conventional topology on the U-plane is that as illustrated in FIG. 17, inbound security associations and outbound security associations are established respectively between a serving GW 506 and the eNB 501, eNB 502 and eNB 503 and between the respective eNB 501, eNB 502 and eNB 503. The security association connotes a logic communication path established by exchanging items of information such as an encryption system and an encryption key on the basis of IPSec (Security Architecture for Internet Protocol) and IPv6.

Furthermore, one GTP tunnel is set up in each security association. To be specific, the two GTP tunnels for the S1 interface are set up in each of the GTP tunnel groups 520, 521 and 522, and the two GTP tunnels for the X2 interface are set up in each of the GTP tunnel groups 525, 526 and 527.

The LTE mobile communication system as shown in FIG. 15 is assumed to accommodate the oriented eNB 501 for the public network and home eNB 502, and hence the MME 505 and the serving GW 506 need to establish the security associations for the SCTP associations and the GTP tunnels between the considerable number of eNB.

Accordingly, there is a necessity for managing the multiplicity of SCTP associations and security associations, and consequently there arise processing loads on the MME 505 and the serving GW 506. Further, a predetermined traffic occurs for establishing these associations, and hence a traffic quantity within the mobile communication system increases.

The eNB 502 assumed to be used for an individual user and might undergo frequent power ON/OFF operations, and therefore these operations lead to frequent occurrence of high-load processes such as processes of establishing and releasing the SCTP associations and an IPsec key exchange procedure.

Accordingly, if there increases the number of accommodated home eNB causing the frequent occurrence of the high-load processes, there arise the processing loads on the MME and the serving GW for controlling the nodes. Moreover, those processes entail plural flows of traffic, and hence there increases the traffic flowing across the IP network 500 that connects each eNB to the MME or the serving GW.

SUMMARY

It is an object of the present invention to provide a technology capable of reducing a processing load on a base station controller and restraining a traffic quantity within a mobile communication system.

The present invention adopts the following configurations in order to solve the problems given above. Namely, according to a first mode of the present invention, a base station apparatus connected to a base station controller, comprises: a first establishing unit establishing a first logic communication path between the base station apparatus and the base station controller; a second establishing unit establishing a second logic communication path between the base station apparatus and another base station apparatus; and a forwarding unit forwarding data, transmitted and received with another base station apparatus and the base station controller serving as terminal points, as data of another base station apparatus via the first logic communication path and the second logic communication path.

The base station apparatus according to the first mode of the present invention receives the data (the data of another base station apparatus) transmitted and received with another base station apparatus and the base station controller serving as the terminal points via the second logic communication path from another base station apparatus, and forwards the data to the base station controller via the first logic communication path. On the other hand, the base station apparatus receives the data of another base station apparatus from the base station controller via the first logic communication path, and forwards the data to another base station apparatus via the second logic communication path.

The data of another base station apparatus has hitherto been transmitted and received by use of the logic communication path established between another base station apparatus and the base station controller, directly. Namely, the base station controller has hitherto needed to establish and manage the logic communication paths of which the number is equal to the number of the connected base station apparatuses.

According to the first mode of the present invention, the data of another base station apparatus flows via the present base station apparatus, and the base station controller has no necessity for establishing the logic communication path with respect to another base station apparatus and may simply manage only the first logic communication path established with respect to the present base station apparatus.

Therefore, according to the first mode of the present invention, the number of the logic communication paths that should be managed by the base station controller can be decreased, and hence a processing load on the base station controller can be reduced. Further, though a predetermined quantity of traffic is normally required for establishing and releasing the logic communication paths, this traffic quantity can be reduced, so that the system including the base station apparatus according to the first mode of the present invention can decrease the traffic quantity within the system.

Since the base station apparatus according to the first mode of the present invention has this configuration, preferably the first establishing unit sets, within the first logic communication path, a communication pipe via which to transmit the data transmitted and received with the base station apparatus according to the first mode and the base station controller serving as the terminal points and a communication pipe via which to transmit the data of another base station apparatus, the second establishing unit sets, within the second logic communication path, a communication pipe via which to transmit the data transmitted and received as inter-base-station data with the base station apparatus according to the first mode and another base station apparatus serving as the terminal points and a communication pipe via which to transmit the data of another base station apparatus, and the forwarding unit includes a table generating unit storing a combination of identifying information specifying the communication pipe via which to transmit the data of another base station apparatus that is set within the first logic communication path and identifying information specifying the communication pipe via which to transmit the data of another base station apparatus that is set within the second logic communication path in a forwarding table, and forwards the data of another base station apparatus in the received pieces of data on the basis of the communication pipe identifying information set in the received pieces of data and the forwarding table.

The communication pipe via which to transmit the data of another base station apparatus has hitherto been set up in the logic communication path established between another base station apparatus and the base station controller, however, according to the first mode, this logic communication path is deleted, and consequently the communication pipes via which to transmit the data of another base station apparatus are set up in the second logic communication path for a flow via the base station apparatus and the first logic communication path. Communication pipe identifying information specifying the communication pipe is set in the data flowing through this communication pipe.

The base station apparatus according to the first mode determines, based on a forwarding table storing a combination of the communication pipe identifying information set in the received data and the identifying information specifying the communication pipe via which to transmit the data of another base station apparatus, whether the received data is the data of another base station apparatus or not, and forwards the data of another base station apparatus.

Hence, according to the first mode of the present invention, it is feasible to easily determine, from the communication pipe identifying information set in the data and the forwarding table, whether the received data is the data that needs forwarding or not.

Further, in the first mode of the present invention, the first logic communication path and the second logic communication path are SCTP associations, the communication pipe is an SCTP stream, and the identifying information specifying the communication pipe is a stream ID, in which case preferably the second establishing unit sets a least significant bit of the stream ID of the SCTP stream for transmitting the data of the another base station apparatus in the second SCTP association as a determinant bit specifying the data of the another base station apparatus, and the forwarding unit determines whether the received data is the data of the another base station apparatus or not by checking the determinant bit of the stream ID set in the received data.

According to this scheme, the base station apparatus in the first mode of the present invention can promptly determine the data of another base station apparatus from the determinant bit of the stream ID.

Still further, in the configuration according to the first mode of the present invention, preferably, the first establishing unit allocates, in the first SCTP association, the same value to the stream ID of the SCTP stream for transmission in the SCTP streams for transmitting the data of the another base station apparatus and to the stream ID of the SCTP stream for reception.

With this scheme, the base station apparatus according to the first mode of the present invention can properly forward the data of another base station apparatus that is sent from the base station controller by referring to the forwarding table. Moreover, owing to this configuration, on the occasion of generating the forwarding table, the base station apparatus and the base station controller have no necessity of notifying each other of the stream ID for transmitting the data of another base station apparatus.

Yet further, in the first mode of the present invention, the first logic communication path and the second logic communication path are security associations, the communication pipe is a GTP tunnel, and the identifying information specifying the communication pipe is a tunnel end point ID, in which case preferably the table generating unit generates the forwarding table based on a self-generated tunnel end point ID of the tunnel end point in the direction of the base station controller, a tunnel end point ID of the tunnel end point in the direction of the another base station apparatus, a tunnel end point ID sent from the another base station apparatus as the inter-base-station data and generated by the base station controller, and a tunnel end point ID generated by the another base station apparatus.

It should be noted that another mode of the present invention may adopt a communication system including the base station apparatus according to the first mode and the base station controller, may further adopt a communication method executed in the base station apparatus according to the first mode, may still further adopt a program making a computer actualize any one of the functions of the base station apparatus according to the first mode, and may yet further adopt a readable-by-computer storage medium recorded with this program.

According to the present invention, it is feasible to reduce the processing load on the base station controller and restrain the traffic quantity within the mobile communication system.

BRIEF DESCRIPTION OF THE DRAWINGS

FIG. 2 is a conceptual view showing an example of a topology of respective devices building up the mobile communication system in the embodiment;

FIG. 3 is a view illustrating a concept of a topology on a C-plane in the embodiment;

FIG. 4 is a view illustrating a concept of a topology on a U-plane in the embodiment;

FIG. 8 is a diagram showing an example of a routing table for forwarding a slave data chunk;

FIG. 9 is a diagram showing an example of a GTP tunnel translation table for forwarding a slave GTP packet;

FIG. 16 is a conceptual view showing a topology on the C-plane of the related LTE mobile communication system; and FIG. 17 is a conceptual view showing a topology on the U-plane of the related LTE mobile communication system.

DESCRIPTION OF THE PREFERRED EMBODIMENTS

A mobile communication system in an embodiment of the present invention will hereinafter be described with reference to the drawings. Note that a configuration in the embodiment, which will be explained below, is an exemplification, and the present invention is not limited to the configuration in the following embodiment.

[System Architecture]

Figure 1:
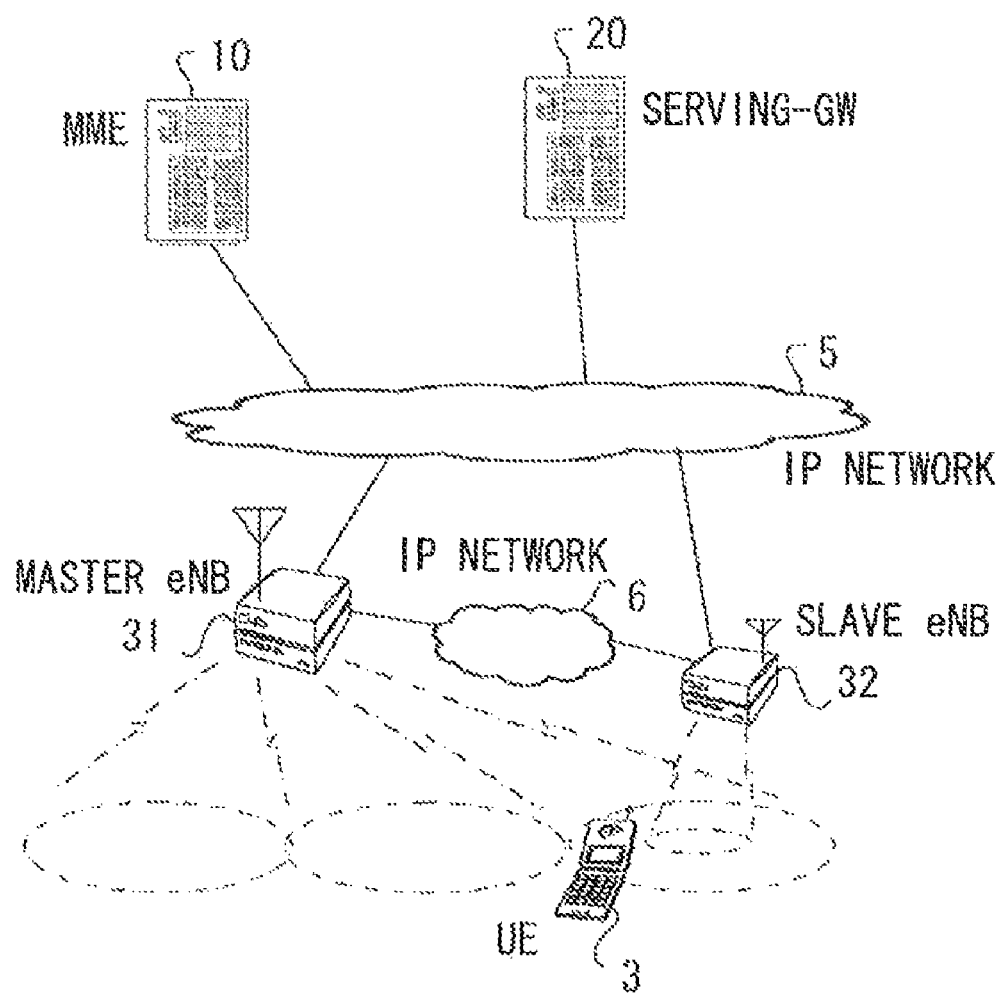
FIG. 1 is a view showing an example of a system architecture of a mobile communication system in the embodiment.

To begin with, a system architecture of the mobile communication system in the embodiment will be described with reference to FIG. 1. FIG. 1 is a view showing an example of the system architecture of the mobile communication system in the embodiment.

The mobile communication system in the embodiment is built up by an MME 10, a serving GW 20, eNB 31, eNB 32, etc. and provides predetermined mobile communication services to mobile terminals (which will hereinafter be symbolized by UE (User Equipment)) 3 connected to the mobile communication system. The UE 3 connects via a wireless link to at least one of the eNB 31 and eNB 32, corresponding to its location, thereby connecting with the mobile communication system. Note that the present embodiment does not limit the mobile communication services provided to the UE 3 from the mobile communication system.

In the mobile communication system according to the embodiment, the eNB are defined in terms of their functions separately as a master eNB 31 and a slave eNB 32. In the mobile communication system according to the embodiment, for example, as illustrated in FIG. 1, the MME 10, the serving GW 20, the master eNB 31 and the slave eNB 32 are connected via an IP network 5 to each other, and the master eNB 31 and the slave eNB 32 are connected via an IP network 6 to each other. The master eNB 31 corresponds to base station apparatus according to a first mode of the present invention, and the MME 10 and the serving GW 20 correspond to base station controllers according to the first mode of the present invention.

[Topology]

Next, a topology between the respective devices (which will hereinafter be also termed nodes) configuring the mobile communication system in the embodiment, will be described with reference to FIGS. 2, 3 and 4. FIG. 2 is a conceptual view illustrating an example of the topology between the respective devices configuring the mobile communication system in the embodiment.

In the mobile communication system according to the embodiment, in the same way as by the LTE communication system discussed above, a transport layer protocol on a C-plane (Control Plane) involves using SCTP, and the transport layer protocol on a U-plane (User Plane) involves using GTP. Further, a GTP tunnel is set up on a security association established by IPSec etc.

In the mobile communication system according to the embodiment, a control signal and a user data signal, which are transmitted and received on the C-plane and the U-plane, are delivered, as shown in FIG. 2, invariably via the master eNB 31 to the slave eNB 32, the MME 10 or the serving GW 20 as the destination. At this time, the master eNB 31 executes a routing process on the SCTP layer and on the GTP layer. Accordingly, the network connection between the slave eNB 32 and the MME 10 and the serving GW 20 is not utilized.

Hereinafter, on the C-plane, messages transmitted and received between the slave eNB such as eNB 32, eNB 33 and the MME 10 each serving as an end point via an S1 interface are referred to as slave data chunks, and messages transmitted and received between the master eNB 31 and the slaves eNB 32, eNB 33 via an X2 interface are termed X2 data chunks.

Moreover, on the U-plane, messages transmitted and received between the slave eNB such as eNB 32, eNB 33 and the serving GW 20 each serving as the end point via the S1 interface are referred to as slave GTP packets, and messages transmitted and received between the master eNB 31 and the slaves eNB 32, eNB 33 via the X2 interface are termed X2GTP packets.

With this scheme, for instance, on the C-plane (the SCTP layer), the master eNB 31 multiplexes the slave data chunks transmitted via the IP network 6 from the slave eNB 32 with the SCTP association established between the MME 10 and the master eNB 31, and thus transmits the data chunks to the MME 10.

Further, in the mobile communication system, an assumption is that two outbound streams (SCTP streams for the transmission) and two inbound streams (SCTP streams for the reception) are respectively set up between the individual nodes on the C-plane, and a single outbound GTP tunnel and a single inbound GTP tunnel are set up between the respective nodes on the U-plane. With this scheme, on the C-plane, common control information and individual control information can be transmitted and received as separate streams. Note that the SCTP stream and the GTP tunnel might be called a communication pipe.

A concept of the topology in the embodiment will be described by way of a different example from the architecture of the mobile communication system in the embodiment illustrated in FIGS. 1 and 2. FIG. 3 is a view showing a concept of the topology on the C-plane in the embodiment. FIG. 4 is a view showing a concept of the topology on the U-plane in the embodiment. FIGS. 3 and 4 exemplify the topology of the mobile communication system built up by the three eNB of the eNB 31, eNB 32 and eNB 33, the MME 10 and the serving GW 20.

As illustrated in FIG. 3, the topology on the C-plane in the embodiment is that an SCTP association 40 between the MME 10 and the master eNB 31 embraces all of the connections between the MME 10 and the respective eNB 31, eNB 32 and eNB 33. With this scheme, the SCTP association 40 embraces the twelve (12=4×3) SCTP streams set up in the SCTP associations, 510, 511 and 512 in the conventional topology illustrated in FIG. 16.

On the other hand, with respect to the connections among the eNB 31, eNB 32 and eNB 33, the connections between the master eNB 31 and the respective slaves eNB 32 and eNB 33 are realized by the eight (8=4×2) SCTP streams set up in the SCTP association for connecting the respective eNB to each other and in the SCTP association for connecting the respective eNB to the MME 10 in the conventional topology illustrated in FIG. 16. To be specific, an association 41 embraces the eight SCTP streams set up in the conventional associations 515 and 512, and an association 42 embraces the eight SCTP streams set up in the conventional associations 516 and 511. Note that the connection between the slaves eNB 32 and 33 is established as hitherto done (an SCTP association 43).

From what has described so far, a stream count, which needs setting up between the individual nodes on the C-plane, can be given as follows.

A stream count between the master eNB and the MME=(a stream count required between the master eNB and the MME)+(a total stream count required between the individual slaves eNB and the MME)

A stream count between the master eNB and the slave eNB=(a stream count required between the master eNB and the slave eNB)+(a stream count required between the slave eNB and the MME)

Note that the SCTP association established between the master eNB 31 and the MME 10 will hereinafter be also referred to as an MME association, and the SCTP association established between the master eNB 31 and the slave eNB 32 will hereinafter be also termed an NB (NodeB) association.

Thus, according to the embodiment, though the SCTP associations whose number is equal to the number of the eNB were established between the MME and the nodes as illustrated in FIG. 16, it is sufficient that the SCTP association 40 is established only between the master eNB 31 and the MME 10 as illustrated in FIG. 3. Hence, according to the embodiment, the number of the SCTP associations established and managed by the MME can be reduced.

As shown in FIG. 4, in the topology on the U-plane according to the embodiment, the connections between the serving GW 20 and the individual eNB 31, eNB 32 and eNB 33 are realized by a GTP tunnel group 50 established between the serving GW 20 and the master eNB 31. The GTP tunnel group 50 includes six (6=2×3) GTP tunnels embraced by GTP tunnel groups 520, 521 and 522 in the conventional topology illustrated in FIG. 17.

With respect to the connections among the individual eNB 31, eNB 32 and eNB 33, the connections between the master eNB 31 and the slaves eNB 32, eNB 33 are actualized by four (4=2×2) GTP tunnels embraced in the GTP tunnel group for connecting the respective eNB and the GTP tunnel group for connecting the respective eNB and the serving GW 20 in the conventional topology shown in FIG. 17. Specifically, the GTP tunnel group 51 includes the four GTP tunnels embraced by the conventional GTP tunnel groups 525, 522, and the GTP tunnel group 52 includes the four GTP tunnels embraced by the conventional GTP tunnel groups 521, 526.

A presumption in the embodiment is that the respective GTP tunnels are set up on security associations established respectively in directions of their communications. Accordingly, the two security associations are established between the individual nodes in which the GTP tunnels are set up. Note that the present embodiment does not limit the processes related to the security associations except restrict the security associations established between the serving GW 20 and the eNB so as to be established only between the master eNB 31 and the serving GW 20, and hence their explanations are herein omitted.

From what has been described so far, the GTP tunnel count, which needs setting up between the individual nodes on the U-plane, can be given as follows.

A GTP tunnel count between the master eNB and the serving GW=(a GTP tunnel count required between the master eNB and the serving GW)+(a total GTP tunnel count required between the individual slaves eNB and the serving GW)

A GTP tunnel count between the master eNB and the slave eNB=(a GTP tunnel count required between the master eNB and the slave eNB)+(a GTP tunnel count required between the slave eNB and the serving GW)

Note that the GTP tunnel established between the master eNB 31 and the serving GW 20 will hereinafter be also referred to as a serving GW tunnel, and the GTP tunnel established between the master eNB 31 and the slave eNB 32 will hereinafter be also termed an NB (NodeB) tunnel.

Thus, according to the embodiment, though the security associations of which the number is equal to the number of the eNB were established between the serving GW and the nodes as illustrated in FIG. 17, it is enough that the security association is established only between the master eNB 31 and the serving GW 20 as illustrated in FIG. 4. Therefore, according to the embodiment, the number of the security associations established and managed by the serving GW can be decreased.

[Configuration of Device]

Functions of the individual devices (which will hereinafter be also referred to as nodes) configuring the mobile communication system in the embodiment, will be respectively explained. Incidentally, a requirement of UE 3 may be a function enabling the UE itself to connect with an LTE mobile communication system like the mobile communication system according to the present embodiment, and hence its explanation is omitted herein. Further, the functions of the individual nodes, which are not related to the slave data chunks on the C-plane and the slave GTP packets on the U-plane, are the same as the conventional functions, and hence their explanations are herein omitted.

<MME>

Figure 5:
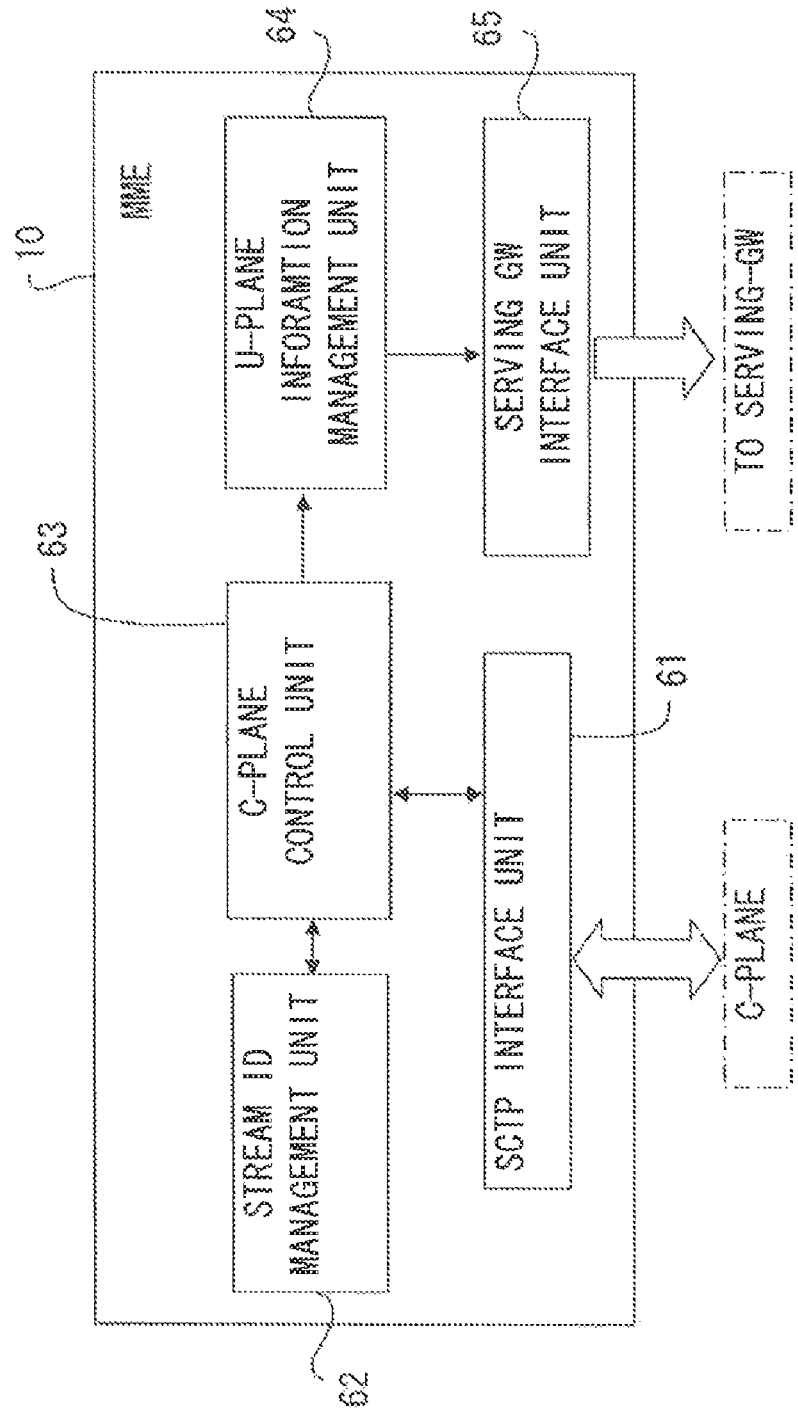
FIG. 5 is a block diagram showing a functional configuration of an MME 10 in the embodiment.

FIG. 5 is a block diagram showing a functional configuration of the MME 10 in the embodiment. As shown in FIG. 5, the MME 10 includes an SCTP interface unit 61, a stream ID management unit 62, a C-plane control unit 63, a U-plane information management unit 64, a serving GW interface unit 65, etc. These function units of the MME 10 shown in FIG. 5 may be respectively realized by hardware circuits and may also be realized in a way that loads a control program stored in the memory into a CPU (Central Processing Unit) and executes the control program. Note that FIG. 5 illustrates mainly the function units characteristic of the present embodiment, and hence the MME 10 may further include function units other than those shown in FIG. 5.

The SCTP interface unit 61 is connected to the IP network 5 and executes the communication process on the C-plane. The SCTP interface unit 61 receives the slave data chunks containing an S1-AP message and a control chunk such as an INIT-ACK chunk from the C-plane control unit 63, and sends these chunks to the IP network 5. On the other hand, the SCTP interface unit 61, when receiving the SCTP data chunks from the IP network 5, sends a stream ID set therein and the data chunks to the C-plane control unit 63.

The C-plane control unit 63 performs the call control, the resource control, etc. The C-plane control unit 63, when establishing the SCTP association, receives the INIT chunk transmitted from the master eNB 31 via the SCTP interface unit 61, and allocates the stream ID so as to satisfy an outbound stream count and an inbound stream count that are contained in the INIT chunk. It is sufficient that the SCTP stream ID is unique in each association, and therefore the MME 10 may allocate the stream ID so as to increment the stream count on a one-by-one basis from "0 (zero)" up to a requested stream count with respect to the MME association. The C-plane control unit 63, after allocating the stream ID, sends the INIT-ACK containing an allocation-successful outbound stream count and an allocation-successful inbound stream count to the SCTP interface unit 61.

The C-plane control unit 63, upon receiving the slave data chunk and the stream ID set in this chunk via the SCTP interface unit 61, sends a UE context as target of the slave data chunk or information on the eNB and the stream ID to the stream ID management unit 62.

Further, the C-plane control unit 63 generates the S1-AP message. The C-plane control unit 63 acquires the stream ID associated with a destination of the generated S1-AP message from the stream ID management unit 62, then sets the stream ID in the data chunk containing the S1-AP message, and sends the data chunk to the SCTP interface unit 61.

The C-plane control unit 63 further executes a process for establishing the GTP tunnel on the U-plane. The C-plane control unit 63 generates tunnel end point information concerning the serving GW 20. To be specific, the C-plane control unit 63, with respect to the serving GW 20, generates a TE-ID of the inbound GTP tunnel for forwarding the slave GTP packet. The generated tunnel end point information about the serving GW 20 is sent to the U-plane information management unit 64.

The C-plane control unit 63 generates, as a process for establishing the GTP tunnel, the slave data chunk containing the S1-AP message (INITIAL CONTEXT SETUP REQUEST or RAB SETUP REQUEST). The C-plane control unit 63 sets the stream ID for forwarding the slave data chunk associated with the target UE context or the target node in this slave data chunk, and sets the tunnel end point information related to the serving GW 20 therein. The C-plane control unit 63 sends the thus-generated slave data chunk to the SCTP interface unit 61.

The C-plane control unit 63 receives, via the SCTP interface unit 61, the slave data chunk containing the S1-AP message (INITIAL CONTEXT SETUP RESPONSE or RAB SETUP RESPONSE) as a response. The C-plane control unit 63 extracts the tunnel end point information set in the slave data chunk, and sends this tunnel end point information to the U-plane information management unit 64.

The stream ID management unit 62 retains each stream ID for every UE context or every eNB for a utilization. The stream ID management unit 62, when receiving a request for the stream ID about the predetermined UE context or eNB from the C-plane control unit 63, sends the stream ID coincident with this request from within the retained pieces of information to the C-plane control unit 63.

The U-plane information management unit 64 retains the tunnel end point information on the serving GW 20 that is generated by the C-plane control unit 63 and the tunnel end point information set in the slave data chunk containing the S1-AP message (INITIAL CONTEXT SETUP RESPONSE or RAB SETUP RESPONSE). These pieces of information are in such an associative relation that when receiving the slave data chunk in which one tunnel end point information is set, the other tunnel end point information is set in the slave data chunk serving as a response thereto. The U-plane information management unit 64 retains these pieces of tunnel end point information taking the opposed side relation and sends these pieces of information to the serving GW interface unit 65.

The serving GW interface unit 65 transmits the tunnel end point information sent from the U-plane information management unit 64 to the serving GW 20 via the IP network 5.

<Serving GW>

Figure 6:
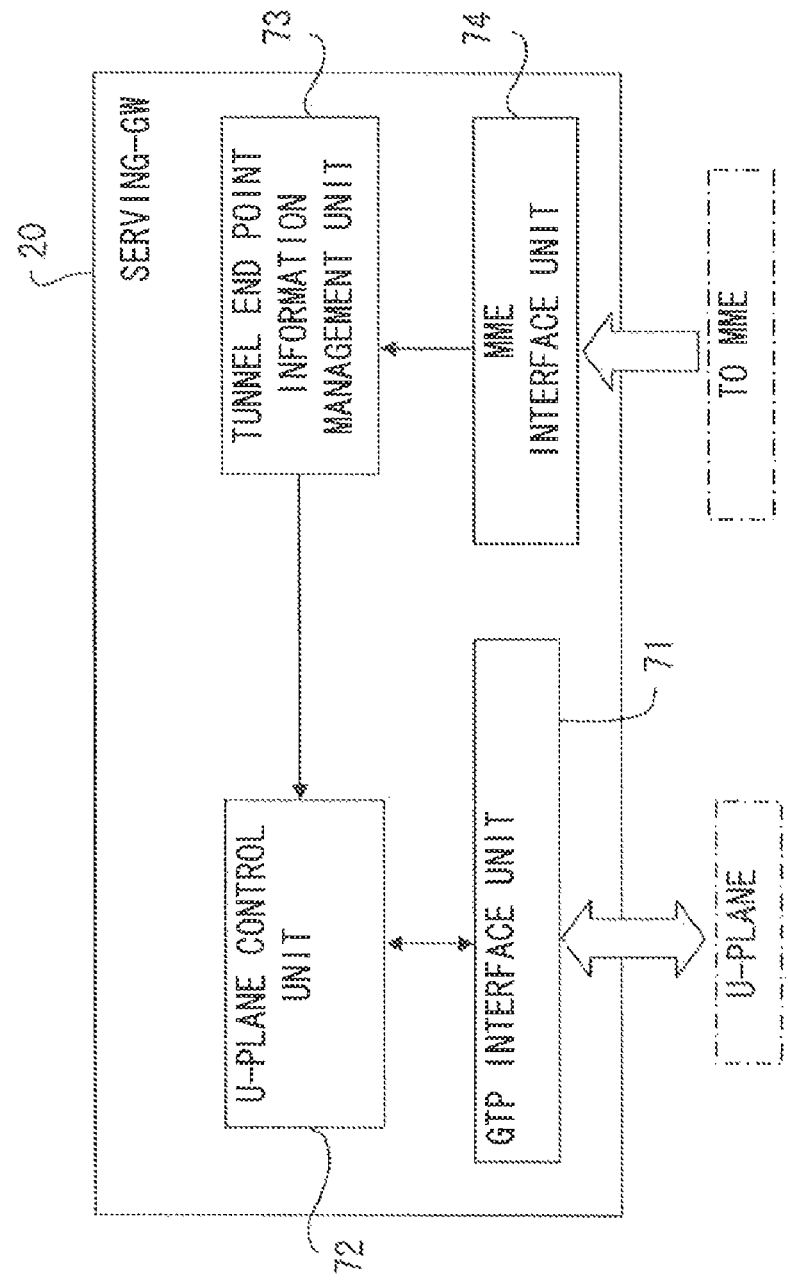
FIG. 6 is a block diagram showing a functional configuration of a serving GW 20 in the embodiment.

FIG. 6 is a block diagram showing a functional configuration of the serving GW 20 in the embodiment. As illustrated in FIG. 6, the serving GW 20 includes a GTP interface unit 71, a U-plane control unit 72, a tunnel end point information management unit 73, an MME interface unit 74, etc. The respective function units of the serving GW 20 shown in FIG. 6 may be respectively realized by hardware circuits and may also be actualized in a way that loads a control program stored in the memory into a CPU and executes the control program. Note that FIG. 6 illustrates mainly the function units characteristic of the present embodiment, and hence the serving GW 20 may further include function units other than those shown in FIG. 6.

The GTP interface unit 71 is connected to the IP network 5 and executes the communication processes on the U-plane. The GTP interface unit 71 receives GTP data packets (containing a slave GTP packet) from the U-plane control unit 72, and sends the packets to the IP network 5. On the other hand, the GTP interface unit 71, upon receiving the GTP data packets via the IP network 5, sends these packets to the U-plane control unit 72.

The MME interface unit 74 is connected to the IP network 5 and executes the processes of the communications with the MME 10. The MME interface unit 74 receives the tunnel end point information sent from the serving GW interface unit 65 of the MME 10 and sends the tunnel end point information to the tunnel end point information management unit 73.

The tunnel end point information management unit 73 receives the self-related (the serving GW 20-related) tunnel end point information sent from the MME 10 and the tunnel end point information that is opposed thereto, and retains these pieces of tunnel end point information.

The U-plane control unit 72 performs the communication processes on the U-plane. To be specific, the U-plane control unit 72 generates the GTP data packet. At this time, the U-plane control unit 72 determines a TE-ID that is set in the slave GTP packet on the basis of the tunnel end point information retained in the tunnel end point information management unit 73. The U-plane control unit 72 sends the slave GTP packet containing the setting of the TE-ID to the GTP interface unit 71.

<Master eNB>

Figure 7:
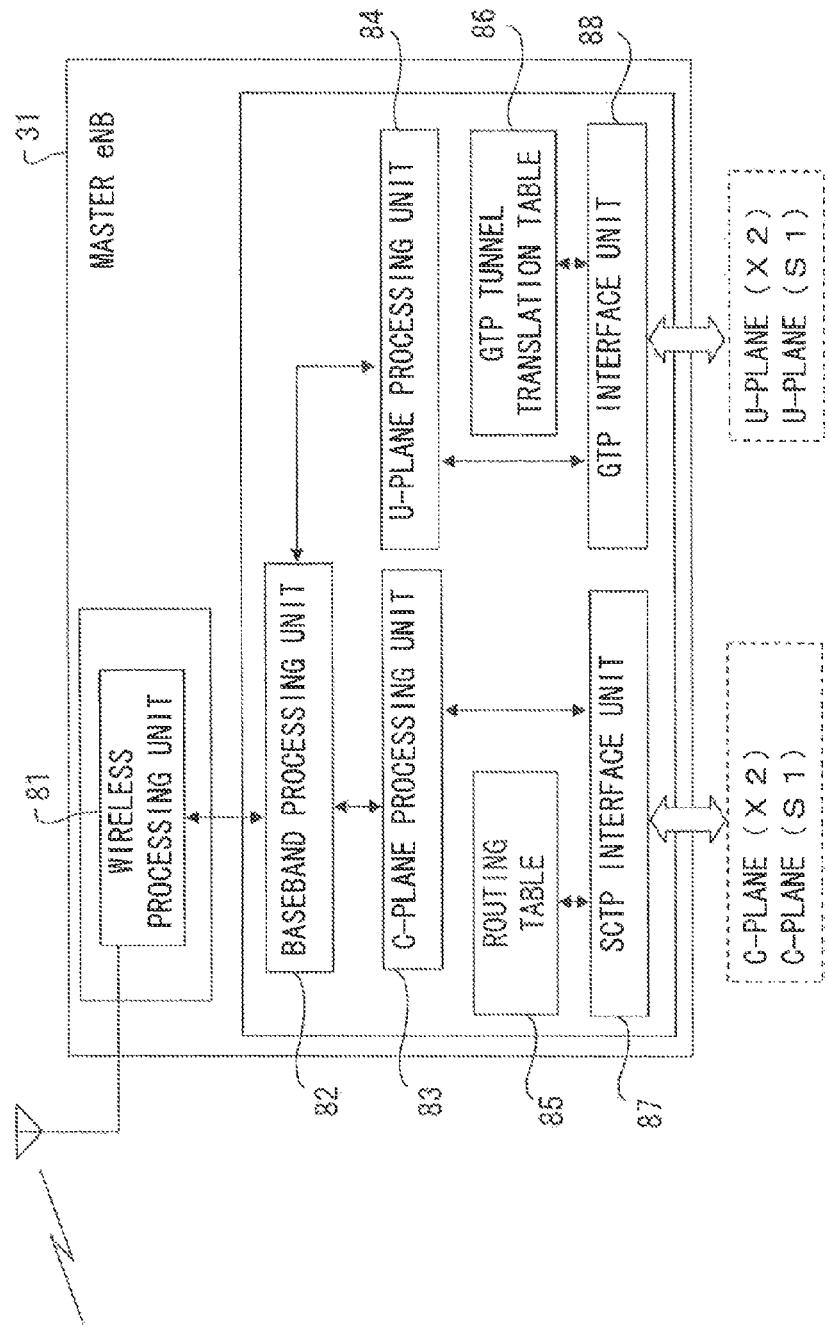
FIG. 7 is a block diagram showing a functional configuration of a master eNB 31 in the embodiment.

FIG. 7 is a block diagram showing a functional configuration of the master eNB 31 in the embodiment. As illustrated in FIG. 7, the master eNB 31 includes a wireless processing unit 81, a baseband processing unit 82, a C-plane processing unit 83, a U-plane processing unit 84, a routing table 85, a GTP tunnel translation table 86, an SCTP interface unit 87, a GTP interface unit 88, etc. The C-plane processing unit 83 corresponds to first establishing unit, second establishing unit and table generating unit according to the first mode of the present invention. The routing table 85 corresponds to a forwarding table in the first mode of the present invention. The SCTP interface unit 87 and the GTP interface unit 88 correspond to forwarding unit in the first mode of the present invention.

The respective function units of the master eNB 31 may be respectively realized by hardware circuits and may also be actualized in a way that loads a control program stored in the memory into a CPU and executes the control program. Note that FIG. 7 illustrates mainly the function units characteristic of the present embodiment, and hence the master eNB 31 may further include function units other than those shown in FIG. 7.

The wireless processing unit 81 and the baseband processing unit 82 process the signals transmitted and the received to and from the UE 3 connected to the mobile communication system in the embodiment. Neither the wireless processing unit 81 nor the baseband processing unit 82 is particularly the function unit characteristic of the present embodiment, and hence their explanations are herein simplified.

The wireless processing unit 81 is connected to an antenna and processes the signal that should be transmitted to the UE 3 from the antenna and the signal received via the antenna and transmitted from the UE 3. The wireless processing unit 81 generates a radio signal from a baseband signal transmitted from the baseband processing unit 82, and transmits the thus-generated radio signal from the antenna. On the other hand, the wireless processing unit 81 frequency-converts the radio signal received from the antenna into the baseband signal, and transmits this baseband signal to the baseband processing unit 82.

The baseband processing unit 82 is constructed of a scheduler, a multiplexing unit (unillustrated), etc, and processes the data packet and control data transmitted from the UE 3. The data packet and the control data, which are processed herein, are sent to the C-plane processing unit 83 and the U-plane processing unit 84. Further, the baseband processing unit 82 receive from the C-plane processing unit 83 and the U-plane processing unit 84 the data packets, etc. that should be transmitted to the UE 3, then generates the baseband signal into which theses data packets, etc. are multiplexed, and transmits the baseband signal to the wireless processing unit 81.

The C-plane processing unit 83 carries out the processes on the C-plane (the SCTP layer). Specifically, the C-plane processing unit 83 executes an SCTP association establishing process, and setting/updating/releasing processes of the routing table 85.

The C-plane processing unit 83 determines the outbound stream count and the inbound stream count needed between the master eNB 31 and the MME 10 in order to establish the MME association. These stream counts may be determined at the maximum counts that are fixedly determined beforehand within the system and may also be determined based on the number of the slave eNBs 32 and the number of the master eNBs 31, which actually operate. In the embodiment, two lines of outbound streams and two lines of inbound streams are respectively set between the nodes, and hence the outbound stream count is determined to be "4" (4=2+(2×N)) (N: the number of slave eNBs), and the inbound stream count is determined to be "4" (4=2+(2×N)) (N: the number of slaves eNBs). The C-plane processing unit 83 generates the INIT chunks in which the thus-determined outbound stream count and inbound stream count are set, and sends the INIT chunks to the SCTP interface unit 87.

Figure 15:
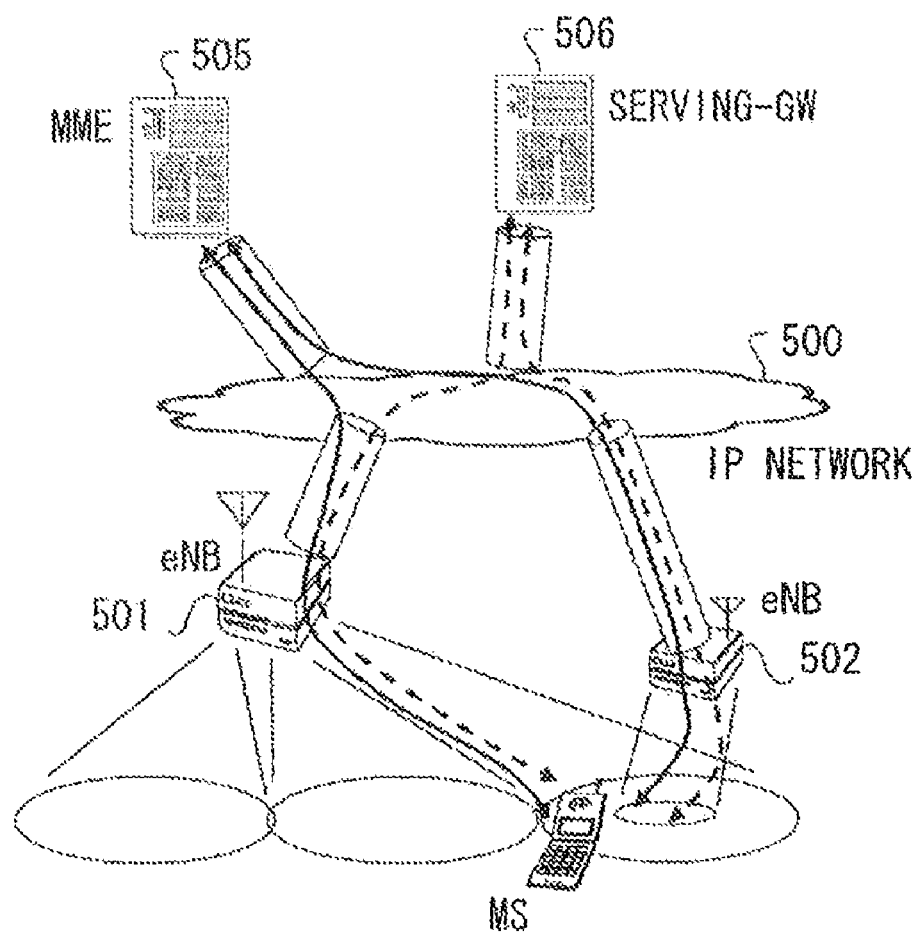
FIG. 15 is a view showing a system architecture of a related LTE mobile communication system.

The C-plane processing unit 83 receives the INIT-ACK chunk serving as a response to the INIT chunk via the SCTP interface unit 61. This INIT-ACK chunk has the setting of the stream count that can be ensured in the MME 10 receiving the INIT chunk. The C-plane processing unit 83 determines based on the stream count set in the INIT-ACK chunk whether the requested stream count is ensured in the MME 10 or not. Herein, if the stream count contained in the INIT-ACK chunk is smaller than the stream count requested in the INIT chunk, the stream for forwarding the slave data chunk about the slave eNB 32 may be determined not to be ensured. In this case, the slave eNB 32 may be requested to establish the association as the normal topology by transmitting the INIT chunk directly to the MME 10 as illustrated in FIG. 15. The C-plane processing unit 83, when receiving the INIT-ACK chunk, allocates the stream IDs for the MME association, corresponding to the stream count contained in this chunk.

On the other hand, the C-plane processing unit 83, when receiving the INIT chunk from the slave eNB 32, acquires the outbound stream count and the inbound stream count each set in this chunk. At this time, it is requested that this INIT chunk has, with respect to both of the outbound streams and the inbound streams, setting of the two streams for X2 data chunks transmitted and received between the master eNB 31 and the slave eNB 32 and setting of the two streams for the slave data chunks transmitted and received between the MME 10 and the slave eNB 32. The C-plane processing unit 83, in response to this setting request, allocates the stream IDs corresponding to the count requested for the NB association.

In the streams set in the NB association, the stream ID for forwarding the slave data chunk may be fixedly determined beforehand as the system scheme. The scheme is that the least significant bit of the stream ID defined by 2 bytes is deemed to be a determinant bit so that it can be determined from only the stream ID whether the chunk is the slave data chunk or not, wherein the stream ID of which the determinant bit is "0" may be determined to be the stream ID for forwarding the data chunks other than the slave data chunk. According to this example in the present embodiment, the bit of each of the stream IDs of the two SCTP streams in the four SCTP streams set between the master eNB 31 and the slave eNB 32 is determined to be "1".

The C-plane processing unit 83, when setting a predetermined stream count in the NB association, generates the INIT-ACK chunk in which the ensured outbound stream count and inbound stream count are set, and sends this INIT-ACK chunk to the SCTP interface unit 87.

The C-plane processing unit 83, when thus allocating the stream IDs for forwarding the slave data chunks of the slave eNB 32 for the MME association and the NB association respectively, sets these pieces of information in the routing table 85. Further, the C-plane processing unit 83, when receiving a SHUT-DOWN chunk as the X2 data chunk from the slave eNB 32, deletes the stream ID for forwarding the slave data chunk for the slave eNB 32 out of the routing table.

The routing table 85 is referred to the SCTP interface unit 87 when forwarding the slave data chunk. FIG. 8 is a diagram showing an example of the routing table for forwarding the slave data chunk. As illustrated in FIG. 8, the routing table 85 stores the received data chunk information and the forwarding destination data chunk information in one-to-one correspondence. The association ID specifying the association via which the data chunk is sent and the stream ID specifying the stream are respectively set in the data chunk information.

To be specific, the C-plane processing unit 83, for forwarding the slave data chunk sent from the MME to the slave eNB 32, sets an association ID ([A] in FIG. 8) of the MME association and an inbound stream ID ([a] in FIG. 8) for forwarding the slave data chunk as reception data chunk information, and sets an association ID ([B] in FIG. 8) of the NB association and an outbound stream ID ([b] in FIG. 8) for forwarding the slave data chunk as the forwarding destination data chunk information associative therewith. At this time, for example, the least significant bit of the outbound stream ID for forwarding the slave data chunk within the NB association becomes "1".

Conversely, the C-plane processing unit 83, for forwarding the slave data chunk sent from the slave eNB 32 to the MME 10, sets an association ID ([B] in FIG. 8) of the NB association and an inbound stream ID ([b] in FIG. 8) for forwarding the slave data chunk as reception data chunk information, and sets an association ID ([A] in FIG. 8) of the MME association and an outbound stream ID ([a] in FIG. 8) for forwarding the slave data chunk as the forwarding destination data chunk information associative therewith.

Note that in the example in FIG. 8, as for the stream ID for forwarding the slave data chunk in the NB association, the same stream ID is used for both of the inbound stream and the outbound stream, however, different stream IDs may also be utilized. In this case, the value of the stream ID may be determined to be a value from which to identify the stream for forwarding the slave data chunk in the slave eNB 32.

The SCTP interface unit 87 is connected to IP networks 5 and 6, and executes the communication processes on the C-plane. Specifically, the SCTP interface unit 87 receives the X2 data chunks containing the INIT chunk, the INIT-ACK chunk and an X2-AP message (GTP TUNNEL SETUP RESPONSE or GTP TUNNEL RELEASE RESPONSE) sent from the C-plane processing unit 83, and sends the X2 data chunks to the IP network 5 or 6. On the other hand, the SCTP interface unit 87 receives the X2 data chunks containing the INIT chunk, the INIT-ACK chunk and the X2-AP message (GTP TUNNEL SETUP REQUEST or GTP TUNNEL RELEASE REQUEST) from the IP network 5 or 6, and sends the X2 data chunks to the C-plane processing unit 83.

Furthermore, the SCTP interface unit 87 refers to the routing table 85 and executes the process of forwarding the slave data chunk. The SCTP interface unit 87, when receiving the data chunk from the IP network 5 or 6, determines based on the stream ID set in this data chunk whether the data chunk is the slave data chunk or not. At this time, if the determinant bit is defined in the stream ID, the determination may be done based on this determinant bit and may also be done based on whether the stream ID is stored in the routing table 85 or not. If the stream ID is stored in the routing table 85, this ID can be determined to be the stream ID for forwarding the slave data chunk.

The SCTP interface unit 87 searches for a record in which the stream ID set in the received slave data chunk is registered in a reception data chunk information field of the routing table 85, and extracts the SCTP association ID and the stream ID, which are registered in a forwarding destination data chunk information field of this record. The SCTP interface unit 87 rewrites the association ID and the stream ID of the received slave data chunk into the extracted SCTP association ID and stream ID, and then performs forwarding.

Incidentally, with respect to the data chunks other than the slave data chunk, when receiving the data chunk, this received data chunk is sent to the C-plane processing unit 83, and, when transmitting the data chunk, the data chunk, if being the X2 data chunk, is transmitted to the slave eNB 32 by making use of the stream ID for the transmission, and further, in the case of the data chunk of the S1 interface between the master eNB 31 and the MME 10, this data chunk is transmitted to the MME 10 by employing the stream ID for this transmission.

The U-plane processing unit 84 executes the processes on the U-plane (the GTP layer). Specifically, to begin with, the U-plane processing unit 84 generates the tunnel end point information (TE-ID) with respect to each security association established between the master eNB 31 and the slave eNB 32. To be specific, the U-plane processing unit 84 generates a transport address of the processing unit 84 itself and the TE-ID of the inbound GTP tunnel for forwarding the slave GTP packet in the direction of the serving GW, and the transport address of the processing unit 84 itself and the TE-ID of the inbound GTP tunnel for forwarding the slave GTP packet in the direction of the slave eNB 32.

The U-plane processing unit 84 sends these two pieces of generated tunnel end point information to the C-plane processing unit 83, and makes a request for transmitting the X2 data chunk (the X2-AP message (GTP TUNNEL SETUP RESPONSE)) in which these pieces of tunnel end point information are set to the slave eNB 32.

The U-plane processing unit 84 further receives the tunnel end point information set in the X2 data chunk containing the X2-AP message (GTP TUNNEL SETUP REQUEST) from the C-plane processing unit 83. The tunnel end point information contains the transport address in the serving GW 20 and the TE-ID of the inbound GTP tunnel for forwarding the slave GTP packet, and the transport address in the slave eNB 32 and the TE-ID of the inbound GTP tunnel for forwarding the slave GTP packet.

The U-plane processing unit 84 registers, in the GTP tunnel translation table 86, the self-generated tunnel end point information in the direction of the serving GW 20 and the self-generated tunnel end point information in the direction of the slave eNB 32, and the pieces of tunnel end point information of the serving GW 20 and of the slave eNB 32 that are sent from the C-plane processing unit 83 in the way of their being associated with each other. Moreover, the U-plane processing unit 84, when receiving the target tunnel end point information together with the X2-AP message (GTP TUNNEL RELEASE REQUEST) from the C-plane processing unit 83, deletes the tunnel end point information for forwarding the slave GTP packet out of the GTP tunnel translation table 86.

The GTP tunnel translation table 86 is referred by the C-plane processing unit 83 when forwarding the slave GTP packet. FIG. 9 is a diagram showing a GTP tunnel translation table for forwarding the slave GTP packet. As shown in FIG. 9, the GTP tunnel translation table 86 stores received GTP tunnel information and forwarding destination GTP tunnel information in the one-to-one correspondence. A transport address and TE-ID related to the GTP tunnel for forwarding the slave GTP packet are set respectively in the GTP tunnel information.

Specifically, the U-plane processing unit 84 sets, as the reception GTP tunnel information, the self-generated transport address and the TE-ID of the inbound GTP tunnel in the direction of the slave eNB 32, and sets, as the forwarding destination GTP tunnel information associative therewith, the transport address of the serving GW 20 and the TE-ID of the inbound GTP tunnel in the GTP tunnel translation table 86, which are sent from the C-plane processing unit 83. Further, the U-plane processing unit 84 sets, as the reception GTP tunnel information, the self-generated transport address and the TE-ID of the inbound GTP tunnel in the direction of the serving GW 20, and sets, as the forwarding destination GTP tunnel information associative therewith, the transport address of the slave eNB 32 and the TE-ID of the inbound GTP tunnel in the GTP tunnel translation table 86, which are sent from the C-plane processing unit 83.

The GTP interface unit 88 is connected to the IP networks 5, 6 and executes the communication processes on the U-plane. To be specific, the GTP interface unit 88 receives the GTP data packet sent from the U-plane processing unit 84 and sends the data packet to the IP network 5 or 6. On the other hand, the GTP interface unit 88 receives the GTP data packets containing the slave GTP packet from the IP network 5 or 6, and sends the GTP data packets excluding the slave GTP packet to the U-plane processing unit 84.

When receiving the slave GTP packet, the GTP interface unit 88 refers to the GTP tunnel translation table 86, and thus executes the process of forwarding the slave GTP data packet. The GTP interface unit 88, upon receiving the GTP data packet from the IP network 5 or 6, determines based on the transport address and the TE-ID each set in this GTP data packet whether the GTP data packet is the slave GTP data packet or not. At this time, the GTP interface unit 88, if the tunnel end point information thereof is stored in the GTP tunnel translation table 86, determines that the GTP data packet is the slave GTP data packet.

The GTP interface unit 88 searches for a record in which the TE-ID and the transport address each set in the received slave GTP data packet are registered in the reception GTP tunnel information field of the GTP tunnel translation table 86, and extracts the transport address and the TE-ID that are registered in the forwarding GTP tunnel information field of this record. The GTP interface unit 88 rewrites the transport address and the TE-ID of the received slave GTP packet into the thus-extracted transport address and TE-ID, and forwards the packet.

<Slave eNB>

Figure 10:
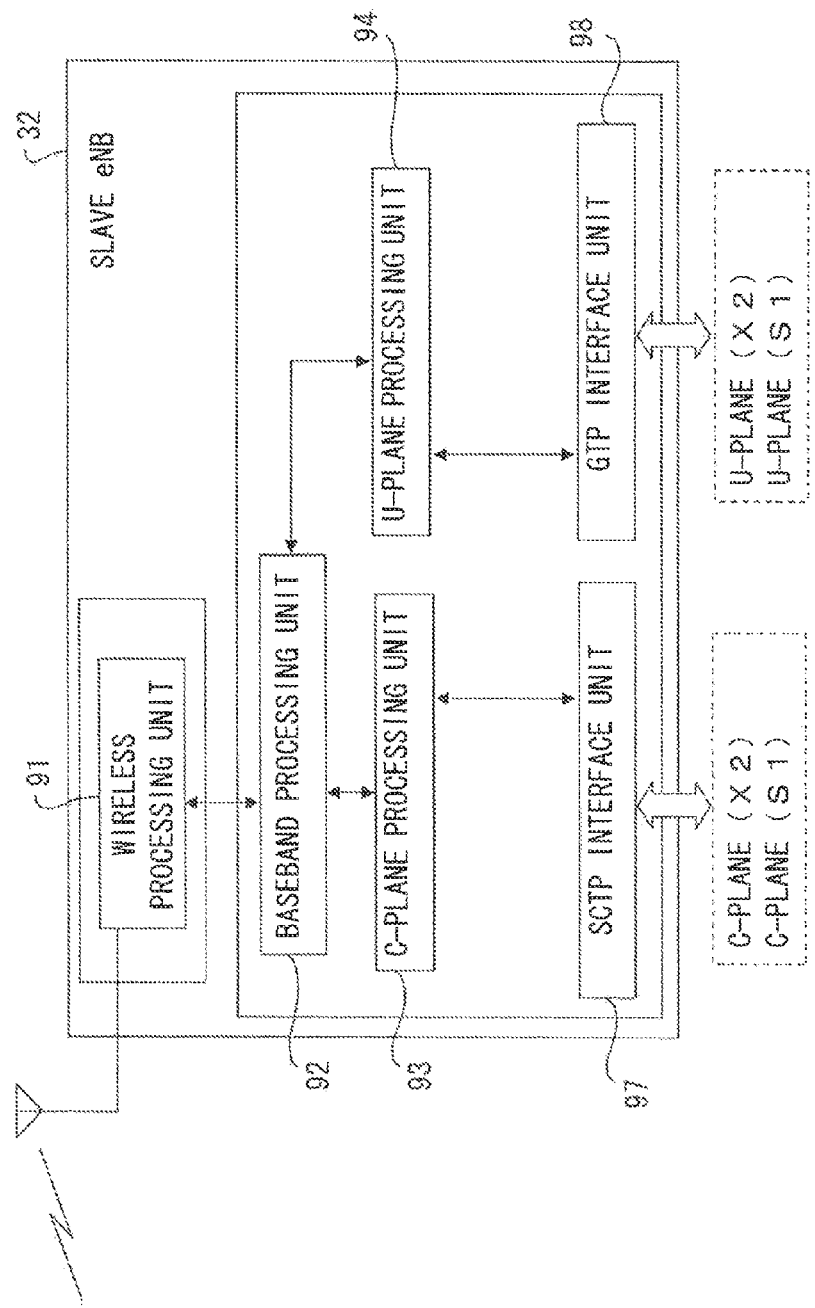
FIG. 10 is a block diagram showing a functional configuration of a slave eNB 32 in the embodiment.

FIG. 10 is a block diagram showing a functional configuration of the slave eNB 32 in this embodiment. As shown in FIG. 10, the slave eNB 32 has nearly the same function units as those of the master eNB 31 described above except not to have the routing table 85 and the GTP tunnel translation table 86 in the function units of the master eNB 31 illustrated in FIG. 7. The following discussion will hereinafter be focused on the different functions from those of the master eNB 31.

An SCTP interface unit 97 and a GTP interface unit 98 have no necessity of having the function of forwarding the slave data chunk. Similarly, a C-plane processing unit 93 and a U-plane processing unit 94 have no necessity of having the function of managing the routing table 85 and the GTP tunnel translation table 86.

The C-plane processing unit 93 determines an outbound stream count and an inbound stream count that should be set in the NB association, and generates the INIT chunk in which these stream counts are set. Further, the C-plane processing unit 93 retains the stream ID for forwarding the slave data chunk that is set in the NB association, and, on the occasion of transmitting the S1-AP message, sets the stream ID in the slave data chunk containing this message.

The U-plane processing unit 94, in order to establish the GTP tunnel for forwarding the slave GTP packet, generates the tunnel end point information about the self-node (the slave eNB 32). To be specific, the U-plane processing unit 94 generates the TE-ID of the inbound GTP tunnel for forwarding the slave GTP packet with respect to the security association established between the master eNB 31 and the slave eNB 32. the U-plane processing unit 94 retains, together with the thus-generated self tunnel end point information, the transport address in the slave eNB 32 that is sent from the slave eNB 32 and the TE-ID (which will hereinafter be symbolized by GTPID#2) of the inbound GTP tunnel for forwarding the slave GTP packet in the direction of the slave eNB 32 as the opposed tunnel end point information. With this scheme, the U-plane processing unit 94 may simply set the retained TE-ID in the generated TE-ID of the slave GTP packet.

Operational Example

An operational example of the mobile communication system according to the embodiment of the present invention will hereinafter be described in a way that distinguishes between the C-plane and the U-plane.

<Operational Example on C-Plane>

The operation of the mobile communication system on the C-plane can be roughly classified into an SCTP initial procedure and an SCTP data chunk forwarding procedure. The SCTP initial procedure will hereinafter be described with reference to FIG. 11, and the SCTP data chunk forwarding procedure will be explained with reference to FIG. 12.

Figure 11:
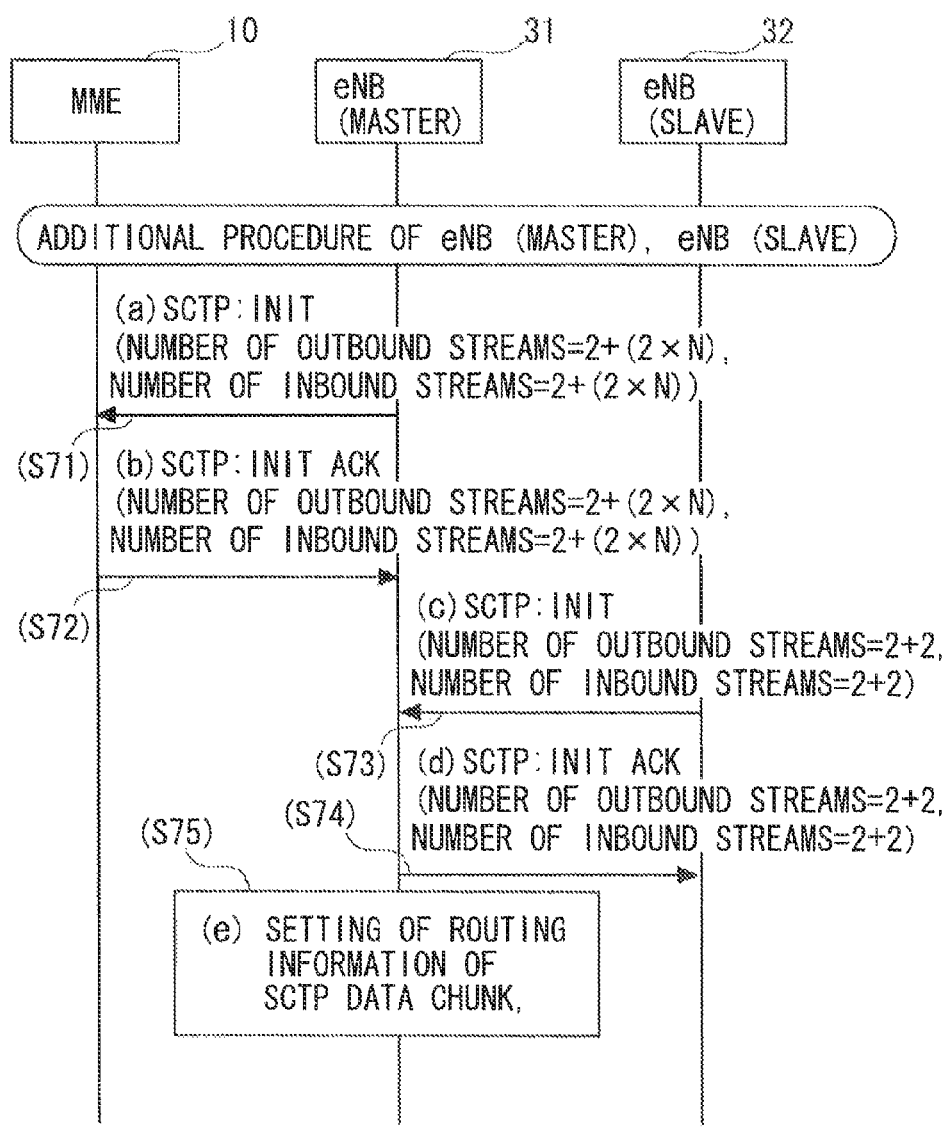
FIG. 11 is a sequence diagram showing an SCTP initial procedure of the mobile communication system in the embodiment.

FIG. 11 is a sequence diagram showing the SCTP initial procedure of the mobile communication system in the embodiment. The mobile communication system needs to establish the SCTP association in which the predetermined number of SCTP streams are set between the respective nodes on the C-plane, which has been already described in the paragraph [Topology]. From this necessity, the mobile communication system establishes the SCTP association between the individual nodes by executing the SCTP initial procedure that will be exemplified as below.

In this SCTP initial procedure, at first, the master eNB 31 transmits the SCTP-based INIT chunk to the MME 10 in order to establish the SCTP association (the MME association) between the master eNB 31 and the MME 10 (S71). The INIT chunk contains the outbound stream count and the inbound stream count that are needed between the master eNB 31 and the MME 10.

In the embodiment illustrated in FIG. 2, the two outbound streams and the two inbound streams are set up between the individual nodes, and hence the four outbound streams and the four inbound streams are required between the master eNB 31 and the MME 10. This configuration is that both of the outbound streams and the inbound streams respectively include the two streams for the S1-AP message transmitted and received between the master eNB 31 and the MME 10 and respectively include the two streams for the slave data chunk transmitted and received between the slave eNB 32 and the MME 10.

From what has been discussed so far, in the INIT chunk, "4" (4=2+(2×N) (N: the number of slaves eNB) is set as the outbound stream count, and "4" (4=2+(2×N) (N: the number of slaves eNB) is set as the inbound stream count.

The MME 10, upon receiving this INIT chunk, allocates the stream IDs so as to satisfy the outbound stream count and the inbound stream count which are contained in the INIT chunk with respect to the MME association. The MME 10, after allocating the stream IDs, sends the INIT-ACK chunk containing the allocation-successful outbound stream count and the allocation-successful inbound stream count back to the master eNB 31 (S72).

The master eNB 31, when receiving this INIT-ACK chunk, checks the outbound stream count and the inbound stream count each contained in the INIT-ACK chunk, thus determining whether the stream counts requested in the INIT chunk are allocated or not. If all of the streams are allocated, the MME association establishing process is completed.

Herein, if the stream counts contained in the INIT-ACK chunk are smaller than the stream counts requested in the INIT chunk, the master eNB 31 determines that the streams for the slave data chunks of the slave eNB 32 are not ensured, and may determine from this point the number of steams that will hereinafter be allocated between the master eNB 31 and the slave eNB 32. In this case, for example, about the slave eNB disabled from ensuring the stream for the slave data chunk, as illustrated in FIG. 15, an available operation is that a connection from the slave eNB directly to the MME 10 may be established as the normal topology.

On the other hand, the slave eNB 32 also transmits the SCTP-based INIT chunk to the master eNB 31 in order to establish the SCTP association (the NB association) between the master eNB 31 and the slave eNB 32 (S73). The INIT chunk contains the outbound stream count and the inbound stream count, which are required between the master eNB 31 and the slave eNB 32.

Herein, the four outbound streams and the four inbound streams are needed between the master eNB 31 and the slave eNB 32. This configuration is that both of the outbound streams and the inbound streams include the two streams for the X2 data chunk transmitted and received between the master eNB 31 and the slave eNB 32 and include the two streams for the slave data chunk transmitted and received between the MME 10 and the slave eNB 32. Accordingly, in this INIT chunk, "4" (4=2+2) is set as the outbound stream count, and "4" (4=2+2) is set as the inbound stream count.

The master eNB 31, when receiving the INIT chunk, with respect to the NB association, allocates the stream IDs so as to satisfy the outbound stream count and the inbound stream count, which are contained in the INIT chunk.

The master eNB 31, after allocating the stream IDs, sends the INIT-ACK chunk containing the allocation-successful outbound stream count and the allocation-successful inbound stream count back to the slave eNB 32 (S74). Herein, if the stream counts contained in the INIT-ACK chunk are smaller than the stream counts requested in the INIT chunk, the slave eNB 32 may determine that the streams for the slave data chunks of the slave eNB 32 itself are not ensured. In this case, for example, the slave eNB 32 may, as illustrated in FIG. 15, request the MME 10 to establish the association as the normal topology by transmitting the INIT chunk directly to the MME 10.

The master eNB 31, after finishing sending back the INIT-ACK chunk, acquires the stream ID for forwarding the slave data chunk in the stream IDs allocated to the NB association, and acquires the stream ID for forwarding the slave data chunk in the stream IDs allocated to the MME association. The master eNB 31 updates, based on the information such as these acquired stream IDs, the routing table for forwarding the slave data chunk (which will hereinafter be simply referred to as the routing table) (S75).

On the other hand, about the streams for the MME association, the master eNB 31 determines any of the allocated SCTP streams for forwarding the slave data chunk of the slave eNB 32. This determining method is not particularly limited.

The master eNB 31, when acquiring the stream ID for forwarding the slave data chunk of the slave eNB 32 for each of the MME association and the NB association, stores these pieces of information in the routing table 85.

The master eNB 31 receives the data chunk sent from the slave eNB 32 and the data chunk sent from the MME 10, then detects the slave data chunk in these received data chunks, and forwards the detected slave data chunk according to the routing table 85 shown in FIG. 8.

Figure 12:
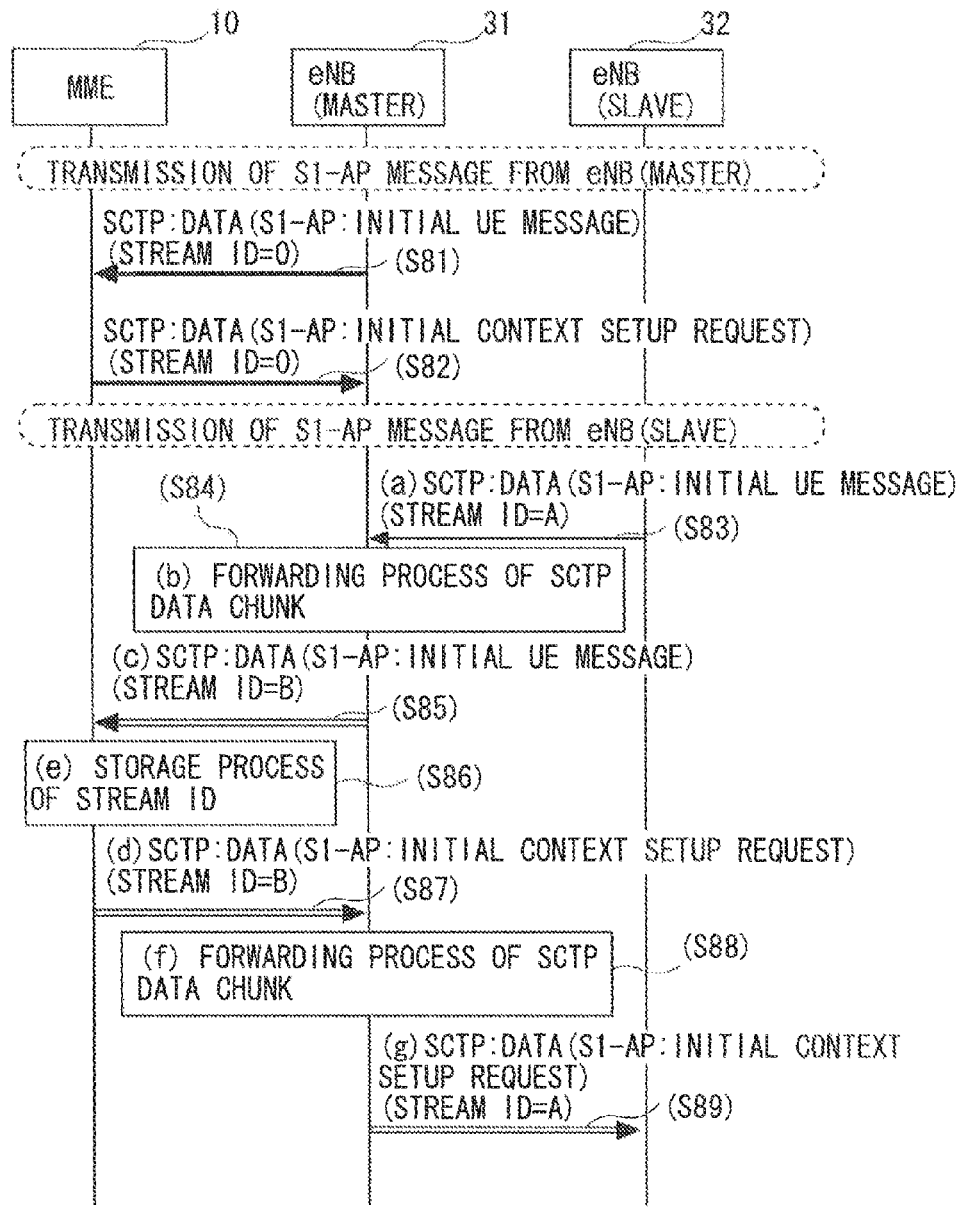
FIG. 12 is a sequence diagram showing an SCTP data chunk forwarding procedure of the mobile communication system in the embodiment.

Next, as the operation of the mobile communication system on the C-plane, the SCTP data chunk forwarding procedure for the dedicated S1 procedure will be described with reference to FIG. 12. FIG. 12 is a sequence diagram showing the SCTP data chunk forwarding procedure of the mobile communication system in the embodiment. When the SCTP association is established between the individual nodes through the SCTP initial procedure, each node is enabled to start transmitting and receiving the SCTP data chunk.

For instance, when a call etc is given from the UE connected to the master eNB 31, the master eNB 31 transmits the S1-AP message defined as INITIAL UE MESSAGE to the MME 10 (S81) as first dedicated S1 message. Note that the present embodiment does not limit the S1-AP message itself that is processed on the application layer, and therefore the in-depth descriptions of the S1-AP message and of the process on the application layer are herein omitted.

The MME 10, when receiving the SCTP data chunk containing the S1-AP message sent from the master eNB 31, sends the S1-AP message defined as INITIAL CONTEXT SETUP REQUEST back to the master eNB 31 (S82). At this time, the S1-AP message is transmitted not via the stream for forwarding the slave data chunk but via the stream ensured in order to be employed in the S1 interface between the master eNB 31 and the MME 10.

Thus, the master eNB 31 transmits the SCTP data chunk addressed to the MME 10 or to the slave eNB 32, in which case the operation is the same as hitherto done. This is the same with a case in which the slave eNB 32 transmits the SCTP data chunk addressed to the master eNB 31 or another slave eNB.

The following is a description of the operation in such a case that the slave eNB 32 transmits the slave data chunk, i.e., transmits the S1-AP message defined as INITIAL UE MESSAGE addressed to the MME 10.

The slave eNB 32 acquires the stream ID for forwarding the slave data chunk of the NB association on the basis of the rule fixed within the system as described above, and transmits the slave data chunk containing the S1-AP message and having the setting of the acquired stream ID to the master eNB 31 via the NB association (S83). According to the example of the routing table 85 in FIG. 8, in this data chunk, [B] is set as the association ID and [b] is set as the stream ID.

The master eNB 31, upon receiving the slave data chunk, acquires the association ID and the stream ID, which are set in this slave data chunk. The master eNB 31 extracts a record in which the acquired information is set as the reception data chunk information from the routing table, and acquires the forwarding destination data chunk information of this record (S84). According to the example of the routing table in FIG. 8, the master eNB 31 extracts the association ID [A] and the stream ID [a] as the forwarding destination data chunk information.

The master eNB 31 rewrites the association ID and the stream ID of the slave data chunk received from the slave eNB 32 into the pieces of information extracted from the routing table, and transmits the information-rewritten slave data chunk to the MME 10 (S85). Note that the master eNB 31, when determining that stream ID extracted out of the data chunk received from the slave eNB 32 does not take a value for forwarding the slave data chunk or that a combination of the extracted association ID and stream ID does not exist in the routing table, determines that the data chunk is the X2 data chunk, and does not execute the forwarding process.

The MME 10, upon receiving the slave data chunk from the MME association via the master eNB 31, retains the stream ID for forwarding the slave data chunk for the corresponding dedicated procedure, which is stored in the slave data chunk (S86). At this time, the MME 10 retains the stream ID so that this stream ID is coupled with the UE context or the eNB information stored in the slave data chunk.

The MME 10, when receiving the slave data chunk containing the S1-AP message defined as INITIAL UE MESSAGE, generates the S1-AP message defined as INITIAL CONTEXT SETUP REQUEST serving as a response to the S1-AP message, and sends this message back to the slave eNB 32. The MME 10 generates the slave data chunk containing the generated S1-AP message and having the setting of the previously retained stream ID and association ID specifying the MME association, and transmits this slave data chunk to the master eNB 31 (S87). In this case, according to the example of the routing table in FIG. 8, [A] is set as the association ID and [a] is set as the stream ID in the slave data chunk.

The master eNB 31, upon receiving this slave data chunk, acquires the association ID and the stream ID that are set in the slave data chunk. The master eNB 31 extracts a record in which the acquired information is set as the reception data chunk information from the routing table, and acquires the forwarding destination data chunk information of this record (S88). According to the example of the routing table in FIG. 8, the master eNB 31 extracts the association ID [B] and the stream ID [b] as the forwarding destination data chunk information.

The master eNB 31 rewrites the association ID and the stream ID of the slave data chunk received from the slave eNB 32 into the pieces of information extracted from the routing table, and transmits the information-rewritten slave data chunk to the slave eNB 32 (S89). Note that the master eNB 31, when determining that a combination of the association ID and the stream ID extracted out of the data chunk received from the MME 10 does not exist in the routing table, determines that the data chunk is not the slave data chunk but the data chunk for the S1 interface between the master eNB 31 and the MME 10, and does not execute the forwarding process.

<Operational Example on U-Plane>

An operation of the mobile communication system on the U-plane is roughly classified into a GTP tunnel establishing procedure, a GTP data packet forwarding procedure and a GTP data packet releasing procedure. The GTP tunnel establishing procedure will hereinafter be described with reference to FIG. 13, and the GTP data packet forwarding procedure and the GTP data packet releasing procedure will be explained with reference to FIG. 14.

Figure 13:
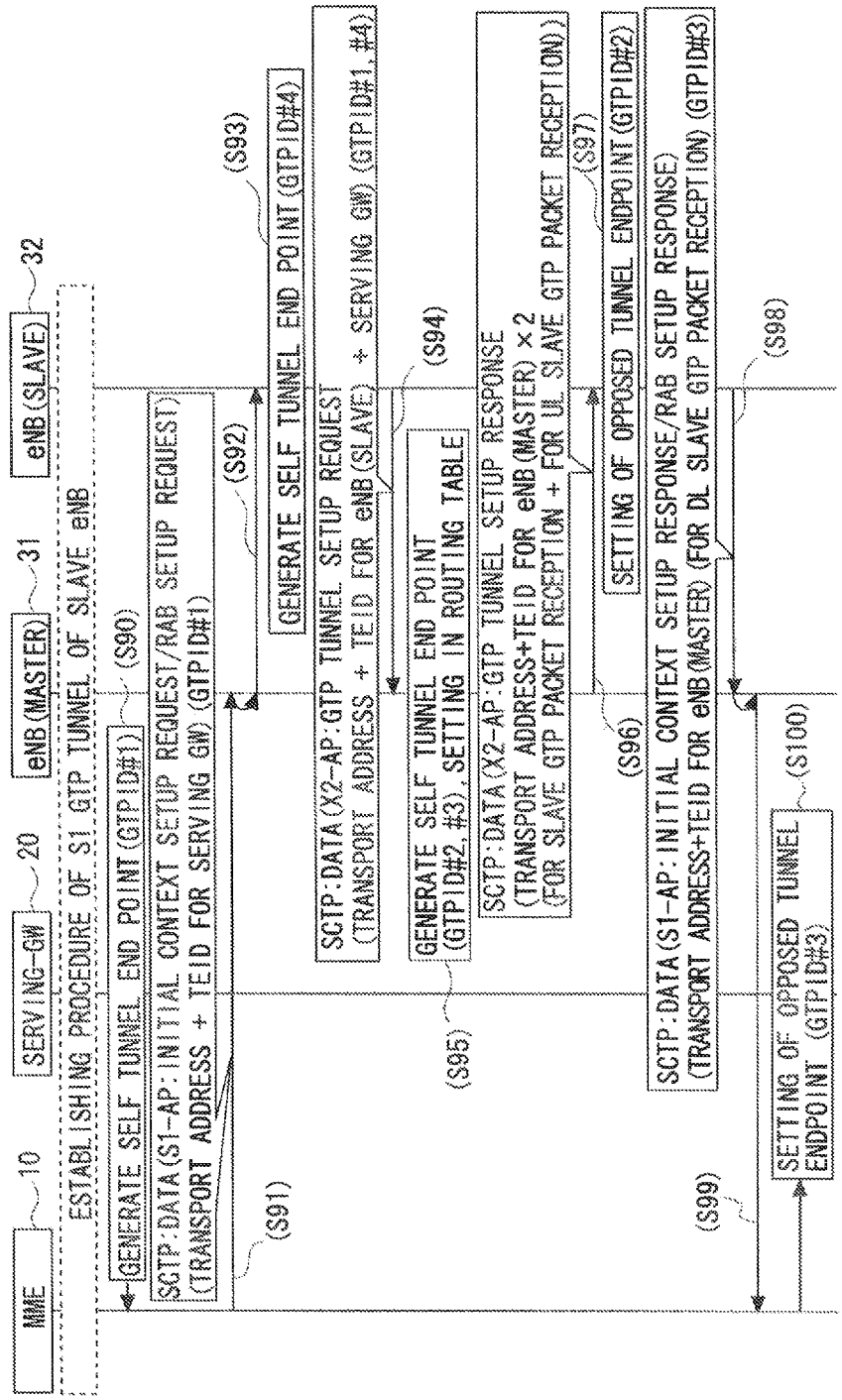
FIG. 13 is a sequence diagram showing a GTP tunnel establishing procedure of the mobile communication system in the embodiment.

FIG. 13 is a sequence diagram showing the GTP tunnel establishing procedure of the mobile communication system in the embodiment. On the U-plane, the mobile communication system needs to establish a predetermined number of GTP tunnels between the individual nodes as explained in the section [Topology] given above. From this necessity, the mobile communication system executes the GTP tunnel establishing procedure given below, thereby establishing the GTP tunnels between the respective nodes. Incidentally, an assumption is that a sequence of IPSec etc is carried out, and two security associations explained in the paragraph [Topology] are established between the nodes. The present embodiment limits none of the security association establishing method, and therefore its description is herein omitted.

Incidentally, FIG. 13 illustrates the procedure of establishing the GTP tunnel used for forwarding the slave GTP packet in the GTP tunnels established between the individual nodes in the embodiment. The GTP tunnels utilized for forwarding other types of GTP data packets may be established by the same technique as the conventional techniques, and hence its explanation is omitted herein.

When establishing the GTP tunnel, the end points determine the self transport addresses and tunnel end point IDs (which will hereinafter be abbreviated to TE-IDs) respectively, and notify each other of the determined pieces of information. The end points related to the slave GTP packet are originally the serving GW 20 and the slave eNB 32. According to the present embodiment, however, the slave GTP packet is sent via the master eNB 31, and hence, with respect to the master eNB 31, there exist the end point in the direction of the slave eNB 32 and the end point in the direction of the serving GW 20.

The MME 10, at the timing of transmitting the S1-AP message (INITIAL CONTEXT SETUP REQUEST or RAB SETUP REQUEST) on the C-plane, starts the process of establishing the GTP tunnel for forwarding the slave GTP packet for the slave eNB 32 serving as the end point for the S1-AP message.

To begin with, the MME 10 generates the tunnel end point information about the serving GW 20 (S90). Specifically, the MME 10, with respect to the serving GW 20, generates the transport address and the TE-ID (which will hereinafter be symbolized by GTPID#1) of the inbound GTP tunnel for forwarding the slave GTP packet. The serving GW 20 is notified of the tunnel end point information of the serving GW 20, which is generated by the MME 10. Note that the tunnel end point information of the serving GW 20 may be generated by the serving GW 20 and notified to the MME 10.

The MME 10 generates the slave data chunk containing the S1-AP message (INITIAL CONTEXT SETUP REQUEST or RAB SETUP REQUEST). The MME 10 sets, in this slave data chunk, the stream ID for forwarding the slave data chunk that is retained in the way of being associated with the target UE context or the target node as shown in (S86) of FIG. 8 and also sets GTPID#1. The thus-generated slave data chunk is transmitted to the master eNB 31 (S91).

The master eNB 31, when receiving the slave data chunk, executes the forwarding process based on the routing table on the C-plane. Through this process, the slave data chunk is rewritten with the predetermined association ID and stream ID and is thus delivered to the slave eNB 32 (S92).

The slave eNB 32, upon receiving the slave data chunk, extracts and retains GTPID#1 that is set in this slave data chunk. Subsequently, the slave eNB 32 generates the self tunnel end point information (S93). To be specific, the slave eNB 32 generates the self transport address and the TE-ID (which will hereinafter be symbolized by GTPID#4) of the inbound GTP tunnel for forwarding the slave GTP packet.

Subsequently, the slave eNB 32 generates the X2 data chunk containing the X2-AP message (GTP TUNNEL SETUP REQUEST) defined as a request for establishing the GTP tunnel for forwarding the slave GTP packet. The slave eNB 32 sets the stream IDs other than for the slave data chunk in this X2 data chunk, and also sets the self tunnel end point information (GTPID#4) and the previously retained GTPID#1. The slave eNB 32 sends the thus-generated X2 data chunk to the master eNB 31 (S94).

The master eNB 31, upon receiving this X2 data chunk, acquires GTPID#1 and GTPID#4 that are set in the X2 data chunk. Note that the master eNB 31, since the stream ID of this data chunk is not stored in the routing table, determines that the X2 data chunk does not need forwarding.

The master eNB 31 subsequently generates the self tunnel end point information (S95). Specifically, the master eNB 31 generates the self transport address and the TE-ID (which will hereinafter be symbolized by GTPID#2) of the inbound GTP tunnel for forwarding the slave GTP packet in the direction of the slave eNB 32, and also generates the self transport address and the TE-ID (which will hereinafter be symbolized by GTPID#3) of the inbound GTP tunnel for forwarding the slave GTP packet in the direction of the serving GW 20.

Furthermore, the master eNB 31 sets the generated IDs "GTPID#2, GTPID#3" and the IDs "GTPID#1, GTPID#4" acquired from the X2 data chunk in the GTP tunnel translation table 86. Incidentally, the master eNB 31 has no necessity for ensuring the resources on the wireless side. Namely, the master eNB 31 simply executes only the forwarding process.

The master eNB 31, upon completion of updating the GTP tunnel translation table 86, generates the X2 data chunk containing the X2-AP message (GTP TUNNEL SETUP RESPONSE) serving as a response to the X2-AP message (GTP TUNNEL SETUP REQUEST). The master eNB 31 sets the stream IDs other than for the slave data chunk in this X2 data chunk, and sets the self-generated tunnel end point information and GTPID#3). The master eNB 31 sends the thus-generated X2 data chunk back to the slave eNB 32 (S96).

The slave eNB 32 receives this X2 data chunk and extracts the tunnel end point information (GTPID#2 and GTPID#3) set in the X2 data chunk. This ID "GTPID#2" is the information about the inbound GTP tunnel in the direction of the slave eNB 32 as viewed from the master eNB 31, and is therefore the information, to the slave eNB 32, about the outbound GTP tunnel in the direction of the master eNB 31.

Accordingly, the slave eNB 32 retains the GTPID#2 as the tunnel end point information of the tunnel end point opposed to the previously self-generated TE-ID (GTPID#4) of the inbound GTP tunnel for forwarding the slave GTP packet (S97). With this scheme, the slave eNB 32, on the occasion of transmitting the slave GTP packet from the slave eNB 32, may simply set GTPID#2 in the TE-ID of the slave GTP packet.

Thereafter, the slave eNB 32 generates the slave data chunk containing the S1-AP message (INITIAL CONTEXT SETUP RESPONSE or RAB SETUP RESPONSE) serving as a response to the previously-received S1-AP message (INITIAL CONTEXT SETUP REQUEST or RAB SETUP REQUEST). The slave eNB 32 sets, in this slave data chunk, the stream ID for forwarding the slave data chunk and also sets GTPID#3 extracted from the X2 data chunk. The slave eNB 32 transmits this slave data chunk to the master eNB 31 (S98).

The master eNB 31, upon receiving this slave data chunk, executes the forwarding process based on the routing table on the C-plane. The slave data chunk is thereby rewritten with the predetermined association ID and stream ID and then delivered to the MME 10 (S99).

The MME 10, when receiving the slave data chunk, extracts and retains GTPID#3 set in the slave data chunk. This ID "GTPID#3" is the information about the inbound GTP tunnel in the direction of the serving GW 20 as viewed from the master eNB 31, and is therefore the information, to the serving GW 20, about the outbound GTP tunnel in the direction of the master eNB 31.

Accordingly, the MME 10 retains GTPID#3 as the tunnel end point information of the tunnel end point opposed to the previously self-generated TE-ID (GTPID#1) of the inbound GTP tunnel for forwarding the slave GTP packet (S100). The serving GW 20 is notified of GTPID#1 and GTPID#3. With this scheme, the serving GW 20, on the occasion of transmitting the slave GTP packet, may simply set GTPID#3 in the TE-ID of the slave GTP packet.

Herein, the tunnel end point information of the GTP tunnel for forwarding the slave GTP packet that is retained in each node may be retained in the way of being associated with the UE context using the GTP tunnel. This scheme enables the acquisition of the tunnel end point information for sending and receiving the AP message related to the UE context on the basis of the UE context information.

Figure 14:
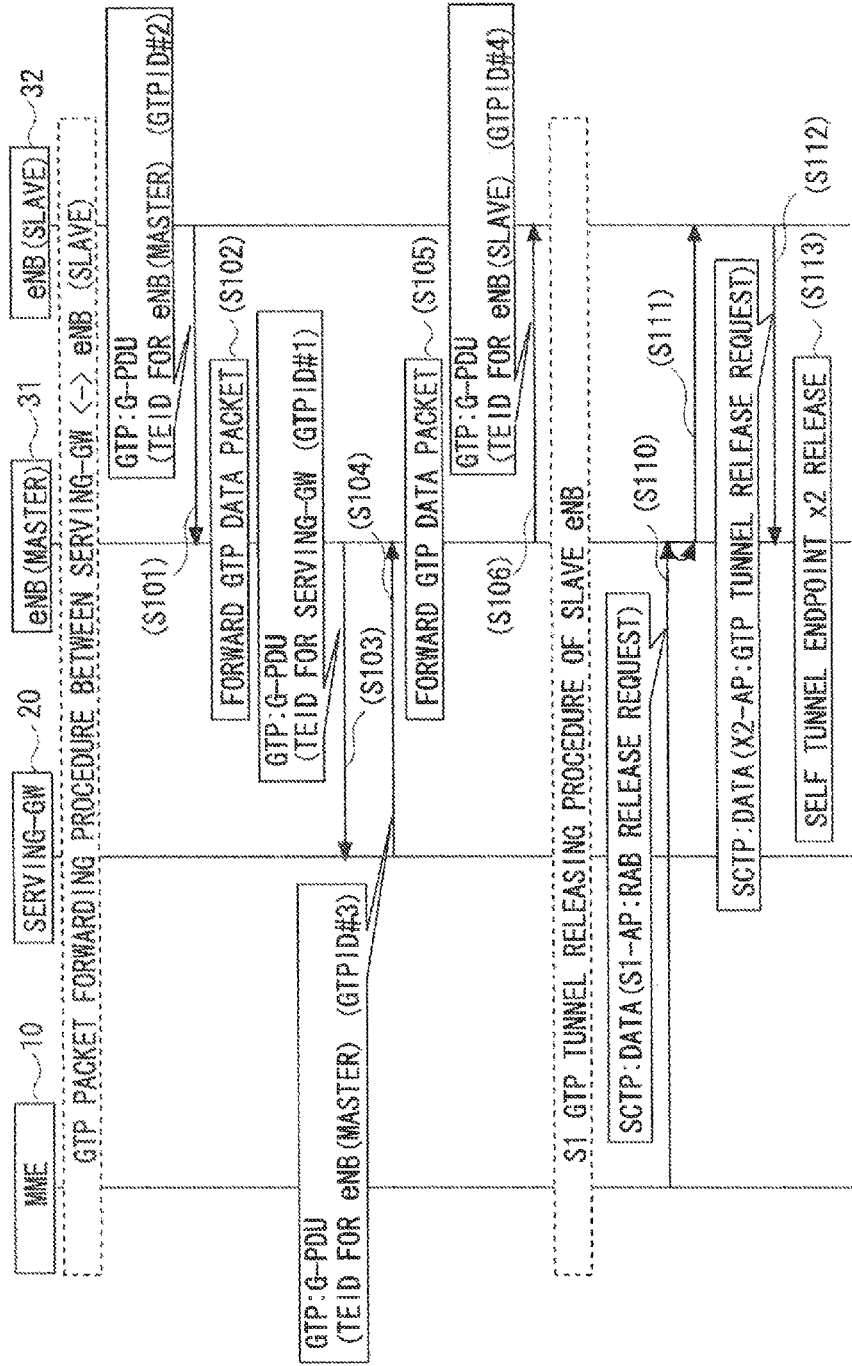
FIG. 14 is a sequence diagram showing a GTP data packet forwarding procedure and a GTP tunnel releasing procedure of the mobile communication system in the embodiment.

Next, the GTP data packet forwarding procedure and the GTP tunnel releasing procedure will be explained with reference to FIG. 14 by way of the operation of the mobile communication system on the U-plane. FIG. 14 is a sequence diagram showing the GTP data packet forwarding procedure and the GTP tunnel releasing procedure of the mobile communication system in the embodiment. When the GTP tunnels are established between the individual nodes through the GTP tunnel establishing procedure described above, each node is enabled to start transmitting and receiving the GTP data packet. Note that the GTP data packets other than the slave GTP packet are processed in the same way as hitherto done, and hence its description is omitted herein.

The following is a description of the operation in such a case that the slave eNB 32 transmits the slave GTP packet.

When a data packet transmission request etc is given from the UE connected to the slave eNB 32, the slave eNB 32 transmits the slave GTP packet (G-PDU) to the master eNB 31 (S101) Set at this time in TE-ID of this slave GTP packet is GTPID#2 retained as the tunnel end point information opposed to the self-generated tunnel end point information (GTPID#4) for forwarding the slave GTP packet in the slave eNB 32.

The master eNB 31, upon receiving this slave GTP packet, translates the TE-ID of the slave GTP packet into the forwarding destination GTP tunnel information (GTPID#1) on the basis of the GTP tunnel translation table described above (S102). The master eNB 31 transmits the slave GTP packet with the thus-translated TE-ID to the serving GW 20 (S103). Note that the forwarding process (S102 and S103) of forwarding the slave GTP packet in the master eNB 31 may be the same as the process executed at the predetermined timing in the handover procedure in the eNB (refer to a document ("LTE Stage 2", 3rd Generation Partnership Project, 3GPP TS 36.300, June 2007, 10.1.2.)). The present embodiment, however, involves not executing the forwarding process as triggered by the handover but utilizing only the forwarding process part because of a difference from the technology described in this document in terms of having no necessity for acquiring the wireless resources in the master eNB 31 executing the forwarding process.

The serving GW 20, when receiving this slave GTP packet, generates the slave GTP packet (G-PDU) serving as a response to this received packet. The ID "GTPID#3" retained as the tunnel end point information opposed to the tunnel end point information (GTPID#1) for forwarding the slave GTP packet of the serving GW 20, is set in the TE-ID of the slave GTP packet serving as the response thereto. The serving GW 20 transmits this slave GTP packet to the master eNB 31 (S104).

The master eNB 31, upon receiving this slave GTP packet, translates, based on the GTP tunnel translation table described above, the TE-ID of the slave GTP packet into the forwarding destination GTP tunnel information (GTPID#4) (S105). The master eNB 31 transmits the slave GTP packet with the thus-translated TE-ID to the slave eNB 32 (S106).

Finally, an operation on the occasion of releasing the thus-utilized GTP tunnel for forwarding the slave GTP packet will be explained. Note that FIG. 14 illustrates a procedure of releasing the GTP tunnel for forwarding the slave GTP packet in the group of GTP tunnels established between the respective nodes in the present embodiment. GTP tunnels for transmitting and receiving other GTP data packets may be released by the same technique as those conventional, and hence their descriptions are omitted herein.

When releasing the GTP tunnel, the MME 10 transmits the slave data chunk containing the S1-AP message (UE CONTEXT RELEASE REQUEST or RAB RELEASE REQUEST) to the master eNB 31 on the C-plane (S110). At this time, the stream ID for forwarding the slave data chunk is set in the slave data chunk.

The master eNB 31, upon receiving the slave data chunk, executes the forwarding process based on the routing table on the C-plane. The slave data chunk is thereby rewritten with the predetermined association ID and stream ID and is then delivered to the slave eNB 32 (S111).

The slave eNB 32, when receiving the slave data chunk, generates the X2 data chunk containing the X2-AP message (GTP TUNNEL RELEASE REQUEST) becoming a GTP tunnel releasing request for forwarding the slave GTP packet.

The slave eNB 32 sets the stream ID other than for the slave data chunk in this X2 data chunk, and sets the should-be-released tunnel end point information (GTPID#2 and GTPID#3) therein. At this time, the slave eNB 32 may determine the should-be-released tunnel end point information on the basis of the UE context of the S1-AP message contained in the received slave data chunk. Moreover, the should-be-released UE context may also be set in the X2 data chunk. The slave eNB 32 sends the thus-generated X2 data chunk to the master eNB 31 (S112).

The master eNB 31, upon receiving the X2 data chunk, extracts the tunnel end point information set in this data chunk, and releases the tunnel end point specified by this tunnel end point information (S113). At this time, the master eNB 31 deletes a record including the released tunnel end point information within the GTP tunnel translation table.

<Operation and Effect of Embodiment>

Herein, an operation and an effect of the mobile communication system according to the embodiment discussed above will be described.

In the mobile communication system according to the embodiment, the eNB are defined in terms of their functions in separation into the master eNB 31 and the slave eNB 32, wherein the data chunk (the slave data chunk) and the GTP data packet (the slave GTP packet), which are transmitted and received via the S1 interface between the slave eNB 32 and the MME 10 or the serving GW 20 as the end points, are transmitted and received via the master eNB 31. For this scheme, the SCTP association and the security association for the GTP are established only between the master eNB 31, the MME 10 and the serving GW 20 but do not need establishing between the slave eNB 32, the MME 10 and the serving GW 20.

Therefore, according to the embodiment, the SCTP associations and the security associations for the GTP, which have hitherto individually needed establishing between all of the eNB, the MME and the serving GW, can be aggregated only between the master eNB 31, the MME 10 and the serving GW 20. In the example (the two eNB) in the present embodiment illustrated in FIG. 2, though the MME and the serving GW have hitherto been required to manage the two SCTP associations or the four security associations, the MME 10 and the serving GW 20 may simply manage the single SCTP association or the two security associations. Further, in the example (the three eNB) in FIGS. 3 and 4, though the MME and the serving GW have hitherto been required to manage the three SCTP associations or the six security associations, the MME 10 and the serving GW 20 may simply manage the single SCTP association or the two security associations.

Namely, according to the present embodiment, it is feasible to decrease the number of the SCTP associations or the security associations that should be managed by the MME 10 and the serving GW 20, and hence processing loads on the MME 10 and the serving GW 20 can be reduced. Further, according to the present embodiment, it is possible to decrease the number of the SCTP associations or the security associations that should be established between the MME, the serving GW and the eNB, so that the traffic (of the data) transmitted and received for the association establishing procedure can be reduced. These effects become more conspicuous with the larger number of the eNB and the larger number of home eNB in which the communication resource establishing procedure might frequently occur due to the power-ON/power-OFF, etc.

For realizing this configuration, the scheme of the present embodiment is that the SCTP association (the MME association) between the master eNB 31 and the MME 10 ensures the stream count including the addition of the stream for the slave data chunk of the slave eNB 32 together with the stream for the data chunk transmitted and received via the S1 interface with the master eNB 31 and the MME 10 serving as the end points. Further, the security association between the master eNB 31 and the MME 10 ensures the GTP tunnel for the slave GTP packet of the slave eNB 32 together with the GTP tunnel for the GTP data packet transmitted and received via the S1 interface with the master eNB 31 and the MME 10 serving as the end points.

With this scheme, according to the present embodiment, when the slaves eNB are provided for extension after operating the system and when the slave eNB under the operation gets into a fault, there is no necessity for reestablishing the SCTP association and the security association between the master eNB 31 and the MME 10 or the serving GW 20. In this point also, according to the present embodiment, the processing loads on the MME 10 and the serving GW 20 can be reduced, and a traffic quantity within the system can be decreased.

In the present embodiment, the master eNB 31 executes the forwarding process on the SCTP layer and the GTP layer, i.e., the routing process of routing the slave data chunk and the slave GTP packet. The master eNB 31, when in the process of establishing the SCTP association and when in the process of establishing the GTP tunnel, generates the routing table used for routing the slave data chunk and the GTP tunnel translation table used for routing the slave GTP packet.

The process of routing the slave data chunk on the C-plane involves using the SCTP-based stream ID. For this reason, the routing table stores a 2-tuple of the stream ID of the received slave data chunk and the stream ID that should be set in the slave data chunk when forwarded.

With this scheme, the master eNB 31 can distinguish, from knowing whether the stream ID set in the received data chunk is stored in the routing table or not, between the received data chunk and the slave data chunk or the SCTP data chunk (the data chunk for the X2 interface or the data chunk for the S1 interface between the master eNB 31 and the MME 10) other than the slave data chunk. Further, for distinguishing between the slave data chunk and the SCTP data chunk other than the slave data chunk, a scheme that the stream ID of which the least significant bit is set to "1" is determined to be the stream ID for the slave data chunk, enables the master eNB 31 to promptly determine, simply from the distinction of the stream ID, whether it is the slave data chunk or not.

In the present embodiment, the master eNB 31 generates independently the routing table. At this time, the routing table is generated so that the stream ID set in the data chunk received by the master eNB 31 from the MME 10 is equalized to the steam ID set in the data chunk forwarded reversely to the MME 10 from the master eNB 31.

This scheme enables the master eNB 31 to independently set the routing table without sending and receiving a special message for generating the routing table, and it is therefore possible to prevent a rise in the traffic within the system in terms of actualizing the present embodiment.

The process of routing the slave GTP packet on the U-plane involves using the GTP-based tunnel end point ID (TE-ID). The GTP tunnel translation table managed by the master eNB 31 therefore stores a 2-tuple of the TE-ID of the received slave GTP packet and the TE-ID that should be set in the slave GTP packet when forwarded. Further, the serving GW 20 and the slave eNB 32 as the end points respectively retain the opposed tunnel end point information, which becomes the destination of the slave GTP packet as the response to the slave GTP packet received by that end point, along with the independently-generated tunnel end point information.

For retaining these pieces of information, the individual nodes notify each other of the tunnel end point information generated by the respective nodes through the SCTP-based S1-AP messages (INITIAL CONTEXT SETUP REQUEST or RAB SETUP REQUEST) and (INITIAL CONTEXT SETUP RESPONSE or RAB SETUP RESPONSE) used for establishing the GTP tunnel, and the X2-AP messages (GTP TUNNEL SETUP REQUEST) and (GTP TUNNEL SETUP RESPONSE) sent and received between the slave eNB 32 and the master eNB 31.

What is claimed is:

1. A base station apparatus coupled to a base station controller, comprising:
a processor to execute processes including:
establishing a first logic communication path between the base station apparatus and the base station controller;
establishing a second logic communication path between the base station apparatus and another base station apparatus;
forwarding, by a forwarding circuit, data, transmitted and received with the another base station apparatus and the base station controller serving as terminal points, as data of the another base station via the first logic communication path and the second logic communication path;
setting, within the first logic communication path, a communication pipe via which to transmit the data transmitted and received with the base station apparatus and the base station controller serving as the terminal points and a communication pipe via which to transmit the data of the another base station apparatus;
setting, within the second logic communication path, a communication pipe via which to transmit the data transmitted and received as inter-base-station data with the base station apparatus and the another base station apparatus serving as the terminal points and a communication pipe via which to transmit the data of the another base station apparatus;
storing a combination of identifying information specifying the communication pipe via which to transmit the data of the another base station apparatus that is set within the first logic communication path and identifying information specifying the communication pipe via which to transmit the data of the another base station apparatus that is set within the second logic communication path in a forwarding table; and
forwarding the data of the another base station apparatus in the received pieces of data on the basis of the communication pipe identifying information set in the received pieces of data and the forwarding table.

2. The base station apparatus according to claim 1, wherein the first logic communication path and the second logic communication path are SCTP associations, and at least one communication pipe of the communication pipe corresponding to the first logic communication path and the communication pipe corresponding to the second logic communication path is an SCTP stream,
the identifying information specifying the communication pipe is a stream ID,
the processor sets a least significant bit of the stream ID of the SCTP stream for transmitting the data of the another base station apparatus in a second SCTP association of the SCTP associations as a determinant bit specifying the data of the another base station apparatus, and determines whether the received data is the data of the another base station apparatus or not by checking the determinant bit of the stream ID set in the received pieces of data.

3. The base station apparatus according to claim 1, wherein the first logic communication path and the second logic communication path are SCTP associations, and at least one communication pipe of the communication pipe corresponding to the first logic communication path and the communication pipe corresponding to the second logic communication path is an SCTP stream,
- the identifying information specifying the communication pipe is a stream ID, and
- the processor allocates, in a first SCTP association of the SCTP associations, the same value to the stream ID of the SCTP stream for transmission in SCTP streams for transmitting the data of the another base station apparatus and to the stream ID of the SCTP stream for reception.

4. The base station apparatus according to claim 1, wherein the first logic communication path and the second logic communication path are security associations, and at least one communication pipe of the communication pipe corresponding to the first logic communication path and the communication pipe corresponding to the second logic communication path is a GTP tunnel,
- the identifying information specifying the communication pipe is a tunnel end point ID, and
- the processor generates the forwarding table based on a self-generated tunnel end point ID of the tunnel end point in the direction of the base station controller, a tunnel end point ID of the tunnel end point in the direction of the another base station apparatus, a tunnel end point ID sent from the another base station apparatus as the inter-base-station data and generated by the base station controller, and a tunnel end point ID generated by the another base station apparatus.

5. A communication method executed by a mobile communication system including a plurality of base station apparatuses and a base station controller, the method comprising:
- establishing a first logic communication path between a master apparatus in the plurality of base station apparatuses and the base station controller;
- establishing a second logic communication path between the master apparatus and a slave apparatus in the plurality of base station apparatuses;
- making the master apparatus forward data, transmitted and received with the slave apparatus and the base station controller serving as terminal points, as data for the slave apparatus via the first logic communication path and the second logic communication path;
- setting, within the first logic communication path, a communication pipe via which to transmit, as for the master apparatus, the data transmitted and received with the master apparatus and the base station controller serving as the terminal points and a communication pipe via which to transmit the data for the slave apparatus;
- setting, within the second logic communication path, a communication pipe via which to transmit inter-base-station data transmitted and received with the master apparatus and the slave apparatus serving as the terminal points and a communication pipe via which to transmit the data for the slave apparatus;
- storing a combination of identifying information specifying the communication pipe via which to transmit the data for the slave apparatus that is set within the first logic communication path and identifying information specifying the communication pipe via which to transmit the data for the slave apparatus that is set within the second logic communication path in a forwarding table; and
- forwarding the data for the slave apparatus in the received pieces of data on the basis of the communication pipe identifying information set in the received pieces of data and the forwarding table.

6. The communication method according to claim 5, wherein the first logic communication path and the second logic communication path are SCTP associations, and at least one communication pipe of the communication pipe corresponding to the first logic communication path and the communication pipe corresponding to the second logic communication path is an SCTP stream,
- the identifying information specifying the communication pipe is a stream ID,
- the method further comprises setting a least significant bit of the stream ID of the SCTP stream for transmitting the data for the slave apparatus in a second SCTP association of the SCTP associations as a determinant bit specifying the data for the salve apparatus, and determining whether the received data is the data for the slave apparatus or not by checking the determinant bit of the stream ID set in the received pieces of data.

7. The communication method according to claim 5, wherein the first logic communication path and the second logic communication path are SCTP associations, and at least one communication pipe of the communication pipe corresponding to the first logic communication path and the communication pipe corresponding to the second logic communication path is an SCTP stream,
- the identifying information specifying the communication pipe is a stream ID, and
- the method further comprises allocating, in a first SCTP association of the SCTP associations, the same value to the stream ID of the SCTP stream for transmission in SCTP streams for transmitting the data for the slave apparatus and to the stream ID of the SCTP stream for reception.

8. The communication method according to claim 5, wherein the first logic communication path and the second logic communication path are security associations, and at least one communication pipe of the communication pipe corresponding to the first logic communication path and the communication pipe corresponding to the second logic communication path is a GTP tunnel,
- the identifying information specifying the communication pipe is a tunnel end point ID, and
- the method further comprises generating the forwarding table based on a self-generated tunnel end point ID of the tunnel end point in the direction of the base station controller, a tunnel end point ID of the tunnel end point in the direction of the slave apparatus, a tunnel end point ID sent from the slave apparatus as the inter-base-station data and generated by the base station controller, and a tunnel end point ID generated by the slave apparatus.

9. The mobile communication system, comprising:
a plurality of base station apparatuses; and
a base station controller,
a master apparatus in the plurality of base station apparatuses, to execute processes including:
establishing a first logic communication path between the master apparatus and the base station controller;
establishing a second logic communication path between the master apparatus and a slave apparatus in the plurality of base station apparatuses;
forwarding data, transmitted and received with the slave apparatus and the base station controller serving as terminal points, as data for the slave apparatus via the first logic communication path and the second logic communication path;

setting, within the first logic communication path, a communication pipe via which to transmit, as for the master apparatus, the data transmitted and received with the master apparatus and the base station controller serving as the terminal points and a communication pipe via which to transmit the data for the slave apparatus;

setting, within the second logic communication path, a communication pipe via which to transmit inter-base-station data transmitted and received with the master apparatus and the slave apparatus serving as the terminal points and a communication pipe via which to transmit the data for the slave apparatus;

storing a combination of identifying information specifying the communication pipe via which to transmit the data for the slave apparatus that is set within the first logic communication path and identifying information specifying the communication pipe via which to transmit the data for the slave apparatus that is set within the second logic communication path in a forwarding table; and forwarding the data for the slave apparatus in the received pieces of data on the basis of the communication pipe identifying information set in the received pieces of data and the forwarding table.

10. The mobile communication system according to claim 9, wherein the first logic communication path and the second logic communication path are SCTP associations, and at least one communication pipe of the communication pipe corresponding to the first logic communication path and the communication pipe corresponding to the second logic communication path is an SCTP stream, the identifying information specifying the communication pipe is a stream ID, the master apparatus sets a least significant bit of the stream ID of the SCTP stream for transmitting the data for the slave apparatus in a second SCTP association of the SCTP associations as a determinant bit specifying the data for the salve apparatus, and the master apparatus determines whether the received data is the data for the slave apparatus or not by checking the determinant bit of the stream ID set in the received pieces of data.

11. The mobile communication system according to claim 9, wherein the first logic communication path and the second logic communication path are SCTP associations, and at least one communication pipe of the communication pipe corresponding to the first logic communication path and the communication pipe corresponding to the second logic communication path is an SCTP stream, the identifying information specifying the communication pipe is a stream ID, and the master apparatus allocates, in a first SCTP association of the SCTP associations, the same value to the stream ID of the SCTP stream for transmission in SCTP streams for transmitting the data for the slave apparatus and to the stream ID of the SCTP stream for reception.

12. The mobile communication system according to claim 9, wherein the first logic communication path and the second logic communication path are security associations, and at least one communication pipe of the communication pipe corresponding to the first logic communication path and the communication pipe corresponding to the second logic communication path is a GTP tunnel, the identifying information specifying the communication pipe is a tunnel end point ID, and the master apparatus generates the forwarding table based on a self-generated tunnel end point ID of the tunnel end point in the direction of the base station controller, a tunnel end point ID of the tunnel end point in the direction of the slave apparatus, a tunnel end point ID sent from the slave apparatus as the inter-base-station data and generated by the base station controller, and a tunnel end point ID generated by the slave apparatus.

* * * * *